(12) United States Patent  (10) Patent No.: US 8,782,280 B2
Pinto et al.  (45) Date of Patent: Jul. 15, 2014

(54) DEVICE IDENTIFIER SELECTION

(71) Applicant: Sandisk IL Ltd., Kfar Saba (IL)

(72) Inventors: Yosi Pinto, Kfar Vradim (IL); Eitan Mardiks, Ra'anana (IL)

(73) Assignee: Sandisk IL Ltd., Kfar Saba (IL)

( * ) Notice: Subject to any disclaimer, the term of this patent is extended or adjusted under 35 U.S.C. 154(b) by 0 days.

(21) Appl. No.: 13/758,393

(22) Filed: Feb. 4, 2013

(65) Prior Publication Data

US 2013/0151677 A1   Jun. 13, 2013

Related U.S. Application Data

(62) Division of application No. 12/509,832, filed on Jul. 27, 2009, now Pat. No. 8,392,614.

(51) Int. Cl.
G06F 15/177 (2006.01)
G06F 15/16 (2006.01)

(52) U.S. Cl.
USPC ............................ 709/245; 709/222; 709/251

(58) Field of Classification Search
USPC ........................ 709/220, 222, 245, 251, 254
See application file for complete search history.

(56) References Cited

U.S. PATENT DOCUMENTS

| | | |
|---|---|---|
| 4,982,400 A | 1/1991 | Ebersole |
| 5,041,963 A | 8/1991 | Ebersole et al. |
| 5,588,119 A | 12/1996 | Vincent et al. |
| 5,793,981 A | 8/1998 | Billings |
| 5,802,289 A | 9/1998 | Oprescu |
| 5,826,037 A | 10/1998 | Stiegler et al. |
| 5,870,387 A | 2/1999 | Mulla |
| 5,870,566 A | 2/1999 | Joh |
| 5,878,043 A | 3/1999 | Casey |
| 5,892,912 A | 4/1999 | Suzuki et al. |

(Continued)

FOREIGN PATENT DOCUMENTS

| | | |
|---|---|---|
| DE | 3636511 A1 | 4/1998 |
| EP | 0265905 A3 | 1/1990 |

(Continued)

OTHER PUBLICATIONS

International Search Report and Written Opinion dated Jan. 15, 2010 issued in International Application No. PCT/IB2009/006506, 12 pages.

(Continued)

Primary Examiner — Douglas Blair
Assistant Examiner — Benjamin Ailes
(74) Attorney, Agent, or Firm — Toler Law Group

(57) ABSTRACT

A method includes receiving an enumeration message via a host interface of a device that is operatively coupled to a host device and to one or more other devices. The method includes identifying the enumeration message as a command originated by the host device or as a response message from one of the other devices. In response to identifying the enumeration message as a command, an enumeration response message is sent to the host device. The enumeration response message indicates a distinctive device identifier value. The method also includes, in response to identifying the enumeration message as a response message from one of the other devices, reading from the response message an identifier value used by such other device and at least temporarily storing this identifier value at the device to enable the device to select the distinctive device identifier value.

20 Claims, 23 Drawing Sheets

(56) References Cited

U.S. PATENT DOCUMENTS

| | | |
|---|---|---|
| 6,088,726 A | 7/2000 | Watanabe |
| 6,189,059 B1 | 2/2001 | Sotek et al. |
| 6,216,172 B1 | 4/2001 | Kolblin et al. |
| 6,366,964 B1 | 4/2002 | Shima et al. |
| 6,493,770 B1 | 12/2002 | Sartore et al. |
| 6,820,148 B1 | 11/2004 | Cedar et al. |
| 6,832,271 B1 | 12/2004 | Ivan et al. |
| 6,842,789 B1 | 1/2005 | Nazari |
| 6,948,016 B2 | 9/2005 | Cedar et al. |
| 7,103,008 B2 | 9/2006 | Greenblat et al. |
| 7,180,857 B2 | 2/2007 | Kawakami et al. |
| 7,249,200 B2 | 7/2007 | Tischer et al. |
| 7,457,854 B2 | 11/2008 | Trisno et al. |
| 7,467,372 B2 | 12/2008 | Loughlin et al. |
| 7,500,016 B2 | 3/2009 | Kao et al. |
| 7,916,723 B2 | 3/2011 | Fan et al. |
| 8,295,204 B2 * | 10/2012 | Dunsmore et al. ............ 370/258 |
| 8,312,088 B2 | 11/2012 | Pinto |
| 2002/0052960 A1 | 5/2002 | Trisno et al. |
| 2003/0195989 A1 | 10/2003 | Greenblat |
| 2005/0243739 A1 | 11/2005 | Anderson et al. |
| 2006/0156294 A1 | 7/2006 | Fuller, III et al. |
| 2006/0168182 A1 | 7/2006 | Fuller, III et al. |
| 2006/0184335 A1 | 8/2006 | Odom |
| 2007/0130405 A1 | 6/2007 | Cedar et al. |
| 2007/0149122 A1 | 6/2007 | Murphy |
| 2007/0162157 A1 | 7/2007 | Chandhoke |
| 2008/0005262 A1 | 1/2008 | Wurzburg et al. |
| 2008/0177767 A1 | 7/2008 | Lin et al. |
| 2009/0019422 A1 | 1/2009 | Loughlin et al. |
| 2009/0077344 A1 | 3/2009 | Mylly et al. |
| 2009/0082047 A1 | 3/2009 | Phillips et al. |
| 2009/0180483 A1 | 7/2009 | Przybylski |
| 2010/0020809 A1 | 1/2010 | Jones et al. |
| 2010/0260196 A1 | 10/2010 | Holness et al. |

FOREIGN PATENT DOCUMENTS

| | | |
|---|---|---|
| EP | 0468194 A2 | 1/1992 |
| JP | 08-223206 A | 8/1996 |
| WO | 2004095300 A1 | 11/2004 |
| WO | 2007134444 A1 | 11/2007 |
| WO | 2009027802 A1 | 3/2009 |

OTHER PUBLICATIONS

International Search Report and Written Opinion dated Nov. 9, 2010 issued in International Application No. PCT/IB2010/001744, 14 pages.

Extended European Search Report issued on Jun. 11, 2012 in European Patent Application No. 12154579.2, 7 pages.

Extended European Search Report issued on Jun. 11, 2012 in European Patent Application No. 12154580.0, 7 pages.

ARCNET Tutorial, www.ccontrols.com, Sep. 22, 1998, 27 pages.

Notice of Allowance and Fee(s) Due mailed Aug. 10, 2012 in U.S. Appl. No. 12/561,122, 5 pages.

Notice of Allowance and Fee(s) Due mailed Jun. 12, 2012 in U.S. Appl. No. 12/561,122, 5 pages.

Non-Final Office Action mailed Feb. 17, 2012 in U.S. Appl. No. 12/561,122, 15 pages.

Notice of Allowance and Fee(s) Due mailed Nov. 5, 2012 in U.S. Appl. No. 12/509,832, 7 pages.

Non-Final Office Action mailed Jul. 5, 2012 in U.S. Appl. No. 12/509,832, 7 pages.

Restriction Requirement mailed Dec. 8, 2011 in U.S. Appl. No. 12/509,832, 7 pages.

Non-Final Office Action mailed May 27, 2011 in U.S. Appl. No. 12/509,832, 31 pages.

Notification of Reasons for Refusal issued Jul. 30, 2013 in Japanese Application No. 2012-118667, with English translation, 6 pages.

* cited by examiner

DEVICE IDENTIFIER SELECTION

CROSS-REFERENCE TO RELATED APPLICATIONS

This patent application is a divisional application of and claims priority from U.S. patent application Ser. No. 12/509,832 filed Jul. 27, 2009, the contents of which are incorporated by reference herein in their entirety.

FIELD OF THE DISCLOSURE

The present disclosure is generally related to selecting a device identifier.

BACKGROUND

Non-volatile memory devices, such as universal serial bus (USB) flash memory devices and removable memory cards, have allowed for increased portability of data and software applications. Host devices, such as cameras or mobile phones, may include a memory device interface that enables the host device to access one or more memory devices, such as a USB flash memory device or a removable memory card. A host device may perform an enumeration process to determine identifiers for each device coupled to the memory device interface.

A conventional enumeration process may include receiving a first identifier from a first memory device, receiving a second identifier from a second memory device, comparing the second identifier to the first identifier, and requesting a new identifier from the second memory device if the first and second identifiers are the same. Often, however, devices are configured by a device manufacturer to select a common initial identifier value and to increment a previously selected identifier value by a pre-set amount each time the host requests a new identifier from the memory device. To illustrate, each device may initially select the identifier value "1," followed by "2," "3," and so on until an unused identifier value is found. In this case, a fifth enumerated device would select four unusable identifier values prior to selecting an identifier value that does not duplicate identifiers of the previously enumerated devices. Enumerating two devices may require three sequential identifier transmissions from the device to the host, enumerating three devices may require six identifier transmissions, and enumerating five devices may require fifteen identifier transmissions. Hence, there is a need for a more efficient method of selecting a device identifier at a memory device interface.

SUMMARY

Systems and methods to select a device identifier of one or more devices coupled to a memory device interface of a host device are disclosed. Prior to selecting an identifier value, each device may receive an enumeration command from the host device or one or more responses from other devices to one or more enumeration commands. Each device reads one or more identifier values used by other devices when a response is received from another device. Upon receiving an enumeration command or optionally another device's response to an enumeration command, a device selects an identifier value that is distinctive from the used identifier values that have been read by the device and/or that obey certain rules. As a result, each device can select a distinctive identifier value prior to transmitting a response to the host device.

DETAILED DESCRIPTION

Figure 1:
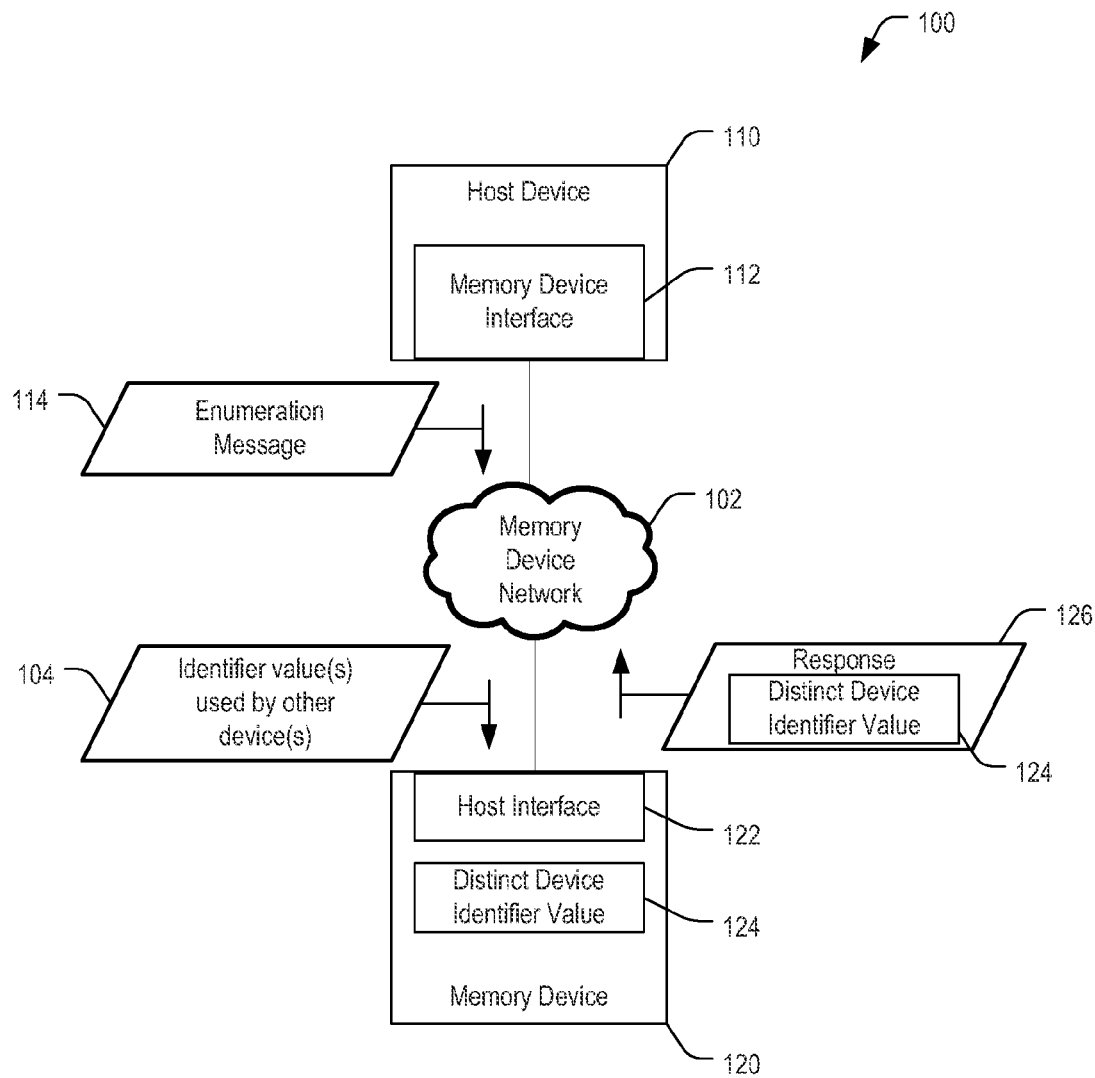
FIG. 1 is a block diagram of a first particular embodiment of a system to select a device identifier value.

FIG. 1 is a block diagram of a first particular embodiment of a system to select a device identifier value. The system 100 includes a host device 110 in communication with a memory device 120 via a memory device network 102. The host device 110 includes a memory device interface 112 coupled to the memory device network 102. For example, the memory device network 102 may be a bus and the memory device interface 112 may include a host bus interface. The host device 110 is configured to send messages, such as commands, data, or any combination thereof, to the memory device 120 and receive messages such as responses, via the memory device network 102. The host device 110 may include an electronic device such as a computer, a mobile phone, a personal digital assistant (PDA), a gaming device, a communication device, a multimedia player device, any other device adapted to communicate with one or more memory devices, or any combination thereof.

The memory device 120 receives data indicating one or more used identifier values 104, such as identifier values provided by other devices (not shown) coupled to the memory device network 102 during an enumeration operation. In response to receiving a device identification message, such as an enumeration message 114, the memory device 120 may select a distinctive device identifier value 124. The distinctive device identifier value 124 is a value other than any of the one or more used identifier values 104. The memory device 120 selectively sends a response 126 indicating the selected distinctive device identifier value 124 to the host device 110 via the memory device network 102. For example, the distinctive device identifier value 124 may be sent to the host 110 in a response as a relative card address (RCA), also sometimes referred to as a "Device ID." By selecting the distinctive device identifier value 124 to avoid the used identifier values 104, the device identifier value 124 may be accepted by the host device 110 without requiring additional identifier value selection by the memory device 120.

The host device 110 is configured to communicate with devices coupled to the memory card network 102 using an identifier value for each device that is distinct from the identifier values of the other devices. The host device 110 may perform an enumeration operation, such as during an initialization period, to request and receive an identifier from each device. The host 110 sends the enumeration message 114, such as an enumeration command or other initialization command, to prompt the memory device 120 to select a device identifier value and receives the selected distinctive device identifier value 124 via the response 126.

The memory device 120 may be a flash memory card, such as an enhanced SD™ or microSD™ card that is adapted to select the distinctive device identifier value 124 as a value different from any of the one or more used identifier values 104. (SD and microSD are trademarks of SD-3C, LLC.) The memory device 120 includes a host interface 122 to enable communication with the host device 110 via the memory device network 102. The memory device 120 may also include a non-volatile memory (not shown), such as a flash memory array, that is accessible to the host device 110 after the distinctive device identifier value 124 has been selected and used by the host device 110 to address messages to the memory device 120.

The memory device 120 is configured to receive messages during an initialization process and to identify one or more received enumeration messages as an enumeration command originated by the host device 110 or as a response message, such as an enumeration message that includes the data indicating zero, one, or more used identifier values 104 and that is originated by one or more other devices (not shown) coupled to the host device 110 via the memory device network 102. An enumeration message may be an enumeration command, an enumeration response, or any other type of message related to an enumeration process or that contains enumeration related information. In response to identifying a received message as an enumeration command, the memory device 120 may selectively send the response 126 including the distinctive device identifier value 124 to the host device 110. In response to identifying the enumeration message as a response message indicating the one or more used identifier values 104, the memory device 120 may read the one or more used identifier values 104 from the response message. The memory device 120 may store, at least temporarily, the identifier values used by other devices coupled to the memory device interface 112 of the host device to enable selection of the distinctive device identifier value 124.

Because the memory device 120 selects the distinctive device identifier value 124 to avoid identifier values used by other devices, a device enumeration may be performed without duplicating any previously-selected identifier values or other non-allowed values. As a result, enumeration of a large number of memory devices coupled to the memory device network 102 may be performed significantly faster than systems where the memory devices rely on the host to determine whether a selected identifier value is distinct from another device's identifier value.

Although the memory device 120 is described as identifying the enumeration message 114 as an enumeration command or an enumeration response message, in other embodiments the memory device 120 may instead respond to the enumeration message based on an internal state of the memory device (e.g. whether the memory device has selected its identifier value or has not selected its identifier value) and the content of the received enumeration message 114. For example, if the enumeration message 114 includes one or more device identifiers in the message content, the memory device 120 may treat the enumeration message 114 as a response message from another device and may store the device identifiers from the message and forward the message to a next device. If the enumeration message 114 includes an identifier of the host device 110, the memory device 120 may treat the enumeration message 114 as a message sent by another device and store any identifier values in the enumeration message 114. If the enumeration message 114 includes an identifier of "broadcast," such as an all-"1" value identifier, as an illustrative non-limiting example, the memory device 120 may generate the distinctive device identifier value 124 and send the distinctive device identifier value 124 to the host 110 via another enumeration message.

Further, the memory device 120 may be operative to select the distinctive device identifier value 124 in accordance with one or more selection rules during an enumeration operation such as upon a system initialization or when the memory device 120 is connected to the memory device network 102 after an enumeration operation has completed. For example, during the enumeration operation the memory device 120 may select the distinctive device identifier value 124 based on one or more selection rules that cause the memory device 120 to operate as described with respect to FIGS. 2-4, FIG. 5, FIGS. 6-8, FIGS. 9-11, or any combination thereof. Selection rules are further described with respect to FIG. 12. As another example, when the memory device 120 is coupled to the host device 110 after the enumeration process has been completed, the host device 110 may transmit the largest device identifier value already selected by another device. In response, the memory device 120 may select the distinctive device identifier value 124 according to selection criteria to be a number larger than the largest device identifier value provided by the host device 110.

Figure 2:
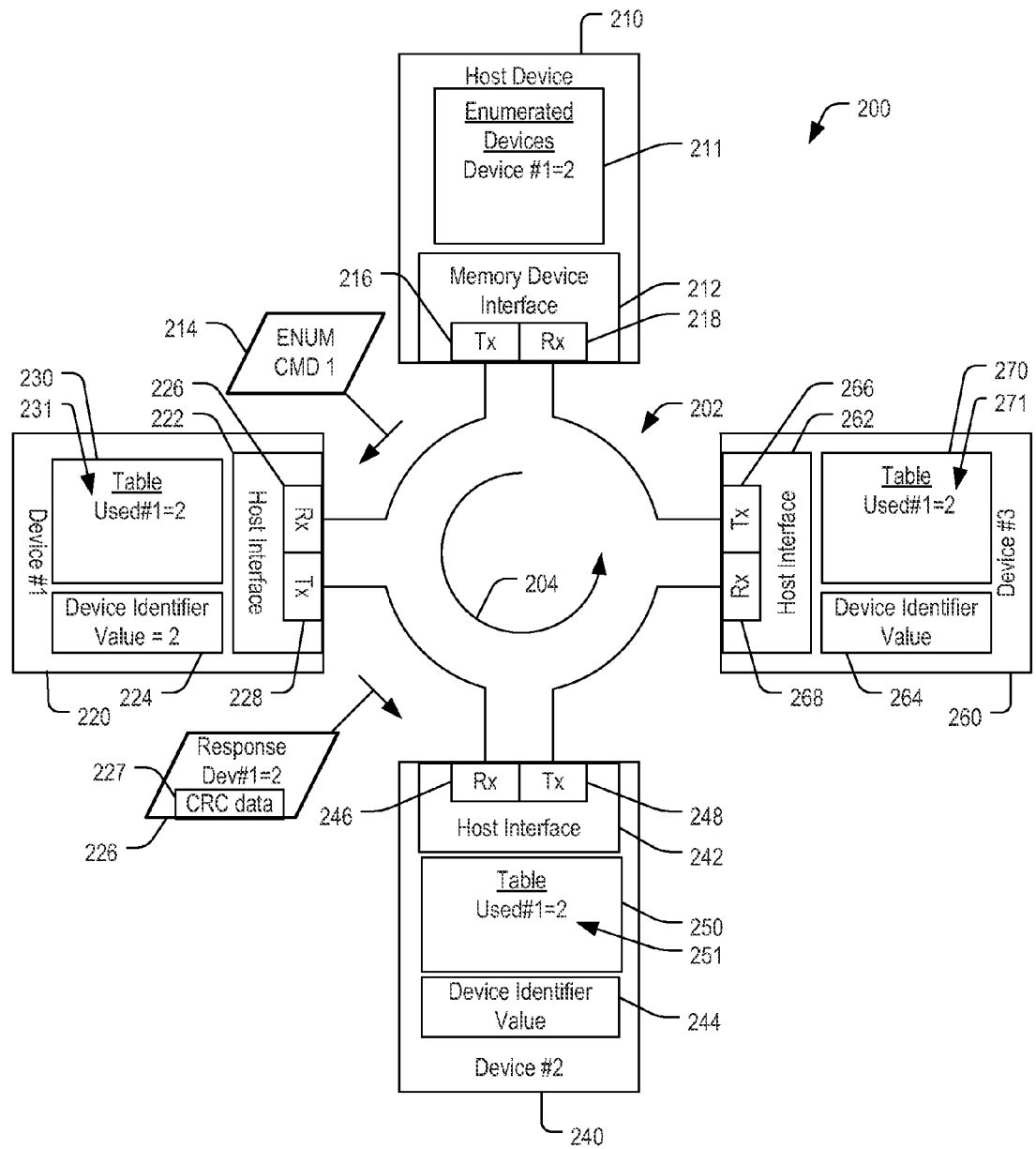
FIG. 2 is a block diagram of a second particular embodiment of a system to select a device identifier value showing a first device response to a first enumeration command in a ring topology.

FIG. 2 is a block diagram of a second particular embodiment of a system 200 to select a device identifier value. The system 200 shows a first device response to a first enumeration command and has a ring topology. The system 200 includes a host device 210 coupled to a representative first device (Device 1) 220, a representative second device (Device 2) 240, and a representative third device (Device 3) 260, via a memory device network 202. Each device 220, 240, and 260 may be configured to store data indicating one or more used identifier values retrieved from responses indicating device identifier value selections of other devices and to select a distinctive identifier value (i.e. an identifier value other than the used identifier values).

The host device 210 includes a storage element, such as a non-volatile memory, a random access memory (RAM), one or more registers, or other tangible storage that is configured to store data corresponding to selected identifier values, illustrated as a table of enumerated devices 211. The host device 210 also includes a memory device interface 212 to enable communication with the devices 220, 240, and 260 via the memory device network 202. The memory device interface 212 has a transmitter circuit 216 to send messages to the devices 220, 240, and 260 and a receiver circuit 218 to receive messages from the devices 220, 240, and 260. As an illustrative example, the host device 210 may correspond to the host device 110 of FIG. 1.

The memory device network 202 may include one or more pairs of data lines to transmit data between devices. The memory device network 202 has a ring topology and messages travel in a single direction along a communication path 204 around the ring. The first device 220 has a first position on the communication path 204, the second device 240 has a second position on the communication path 204, and the third device 260 has a third position on the communication path 204. The sequential order of the positions of the devices 220, 240, and 260 corresponds to a sequential order that messages travel from device to device along the communication path 204. For example, a message sent by the host device 210 to a destination device may include a device identifier value in the message header to indicate the destination device. Each device 220, 240, and 260 that receives the message may examine the message header to determine whether the device is the intended recipient. If the device is not the intended recipient, the device forwards the message (or a copy of the message) to the next device on the communication path 204. The message may be a command that includes a destination identification (DID) field that indicates no specific destination, such as by having a "broadcast" value, in which case any device that is in a state that can accept the command will accept the command as an addressed recipient.

The first device 220 includes a host interface 222 that has a receiver circuit 226 and a transmitter circuit 228. The receiver circuit 226 is configured to receive messages, such as commands and data, from a previous device on the communication path 204, i.e. the host device 210, via the memory device network 202. The transmitter circuit 228 is configured to transmit messages, such as responses, to a next device on the communication path 204, i.e. the second device 240 via the memory device network 202.

The first device 220 includes one or more storage elements, such as one or more of a non-volatile memory, a random access memory (RAM), one or more registers, or other tangible storage, or any combination thereof, that are configured to store data corresponding to used identifier values that have been selected by one or more devices. The storage elements are illustrated as a table 230 storing one or more used identifier values 231. The first device 220 also includes a device identifier tangible storage to store a device identifier value 224 of the first device 220. The first device 220 may include one or more controllers, memory arrays, wireless transceivers, or any combination thereof, as described with respect to FIG. 11 and FIGS. 15-18. As an illustrative example, the first device 220 may correspond to the memory device 122 of FIG. 1. To illustrate, the first device 220 may be a flash memory card.

The first device 220 is configured to receive an enumeration message via the host interface 222 and to identify the received enumeration message as a command originated by the host device 210, such as a first enumeration command (ENUM CMD 1) 214 sent by the host device 210, or as a response message originated by another device. For example, the first device 220 may read header information of a received message and determine a message type based on a message type indicator included in the header information that indicates whether the message is a command or a response message. In response to identifying the enumeration message as the response message, the device 220 may be configured to read an identifier value from the response message and store, at least temporarily, the identifier value at the table 230 as used by another device coupled to the memory device interface 212 of the host device 210. The first device 220 may be configured to accumulate multiple used identifier values at the table 230 that are received via one or more response messages.

In response to identifying the enumeration message as a command, the first device 220 is configured to selectively initiate sending of an enumeration response message indicating the distinctive device identifier value 224 to the host device 210. For example, upon determining that the enumeration message is a command, the first device 220 may select the distinctive device identifier value 224 to be a value other than any identifier value indicated as used by any other device coupled to the memory device interface of the host device 210. To illustrate, the first device 220 may be configured to perform a computation that generates the distinctive device identifier value based on each of the used identifier value(s) 231 at the table 230, such as by adding all stored used identifier value(s) 231 and adding one to the resulting sum.

Alternatively, or in addition, the first device 220 may be configured to select or generate one or more trial identifier values and to compare each trial identifier value to the used identifier value(s) 231 in the table 230 until an identifier value is determined to be distinct from each of the used identifier value(s) 231. As used here, a "trial identifier value" may be a value generated by a device to be tested for distinctiveness based on each identifier value that is indicated as being used. The trial identifier value may be selected as the distinctive device identifier value 224 when the trial identifier value is determined to be distinctive or may be discarded when the trial identifier value is found to duplicate a used identifier value. For example, each of the one or more trial identifier values may be compared to each of the used identifier value(s) 231. The first device 220 may continue iteratively selecting and comparing trial values until a value is determined to not match any of the used identifier value(s) 231. As another example, where the used identifier value(s) 231 are sorted, such as in an ascending or descending order, a trial identifier value may be compared to some but not all of the used identifier value(s) 231 to determine whether the trial identifier value duplicates any of the used identifier value(s) 231. Trial values may be generated randomly or pseudo-randomly, selected from one or more stored values provided by a device manufacturer, generated by another mechanism, or any combination thereof.

After selecting, computing, or otherwise generating an identifier value 224 that is distinct from each of the one or more used identifier values 231, the first device 220 stores the distinctive device identifier value 224 and generates and sends an enumeration response message, such as a response 226, to the host. The response 226 indicates the distinctive device identifier value 224 and is transmitted to the next device on the communication path for eventual delivery to the host device 210 via one or more other devices (e.g. the second device 240 and the third device 260).

The enumeration message (e.g. the first command 214 and/or the response 226) may optionally include error detection data that enables the host device 210 to detect an occurrence of one or more errors that occur as the response 226 is routed to the host device 210. For example, the error detection data may include cyclic redundancy check (CRC) data 227. Alternatively, or in addition, the response 226 may include redundancy data, parity data, or any other error detection or error correction data.

The first device 220 may not respond to all received enumeration messages identified as commands by selecting the distinctive device identifier value 224 and sending a response. For example, a command received at the first device 220 is forwarded without sending an enumeration response message in response to the first device 220 determining that the command indicates one or more recipients but does not indicate the first device 220 as a recipient. To illustrate, the first device 220 may read header information of the command that indicates one or more device identifier values but that does not match the distinctive device identifier value 224 of the first device 220. In this case, the first device 220 forwards the command to the second device 240 without sending a response message to the host 210.

The second device 240 includes a host interface 242 that has a receiver circuit 246 and a transmitter circuit 248. The second device 240 includes one or more storage elements, such as one or more of a non-volatile memory, a random access memory (RAM), one or more registers, or other tangible storage, or any combination thereof. The one or more storage elements are configured to store data corresponding to identifier values that have been selected by a device, illustrated as a table 250 storing one or more used identifier values 251. The second device 240 also includes a device identifier tangible storage to store a distinctive device identifier value 244 of the second device 240.

The third device 260 includes a host interface 262 that has a receiver circuit 266 and a transmitter circuit 268. The third device 260 includes one or more storage elements such as one or more of a non-volatile memory, a random access memory (RAM), one or more registers, or other tangible storage, or any combination thereof. The one or more storage elements are configured to store data corresponding to identifier values that have been selected by a device, illustrated as a table 270 storing one or more used identifier values 271. The third device 260 also includes a device identifier tangible storage to store a distinctive device identifier value 264 of the third device 260.

The second device 240, the third device 260, or any combination thereof, may include one or more controllers, memory arrays, wireless transceivers, or any combination thereof. The second device 240 and the third device 260 may be configured to operate in a substantially similar manner as the first device 220 during a device enumeration operation.

During operation, the host device 210 may send a first enumeration command (ENUM CMD 1) 214 over the communication path 204 and the first enumeration command 214 is received by the first device 220. The first enumeration command 214 may be sent as part of an enumeration operation that the host device 210 initiates during an initialization process. Each device 220, 240, and 260 may be in an initialization state that causes the devices 220, 240, and 260 to be responsive to enumeration commands and to other devices' responses to enumeration commands. Each device 220, 240, and 260 may be initialized to have an empty table 230, 250, 270 of used identifier values and no selected device identifier value 224, 244, 264. As an example, the host device 210 may initiate a power-up event to the devices 220, 240, and 260 by providing power via the memory device network 202, and in response to detecting the power-up event, each device 220, 240, and 260 may enter an initialization state.

The first device 220 may receive the first enumeration command 214 while the table 230 is empty, i.e. before any device has selected a device identifier value. In response, the first device 220 may access the table 230 and perform a computation to generate a distinctive device identifier value of "2." For example, the first device 220 may sum all used identifier value(s) 231 (e.g., the sum may be zero when the table is empty) and add a constant to generate the result "2." Alternatively, the first device 220 may generate or select a trial identifier value of "2." For example, the first device 220 may generate a random identifier value, select an identifier value from a table, or use a pre-set initial identifier value, as illustrative, non-limiting examples. The first device 220 may compare the trial identifier value to the table 230, determine that the table 230 stores no used identifier values, and select the trial identifier value as the distinctive device identifier value 224. The first device 220 may generate the response 226, indicate the host device 210 as the intended recipient of the response 226, and send the response 226 along the communication path 204 to the second device 240. Prior to sending the response 226, the first device 220 may optionally perform a CRC operation on data included in the response 226 and include resulting CRC data 227 to enable detection of one or more transmission errors.

The second device 240 receives the first response 226 and reads the device identifier value 224 ("2") from the response 226. The second device 240 records the device identifier value 224 ("2") to the table 250 as a used indicator value 251 and forwards the response 226 to the third device 260. The third device 260 similarly reads the response 226 and records the device identifier value 224 ("2") to the table 270 and forwards the reply 226 to the host device 210.

The host device 210 receives the response 226 and records the identifier value of "2" as corresponding to the first device 220. The first device 220 may enter an initialization complete state upon sending the response 226, for example, or may enter the initialization complete state upon receiving a signal from the host device 210 that the identifier value has been accepted, as another example.

Figure 3:
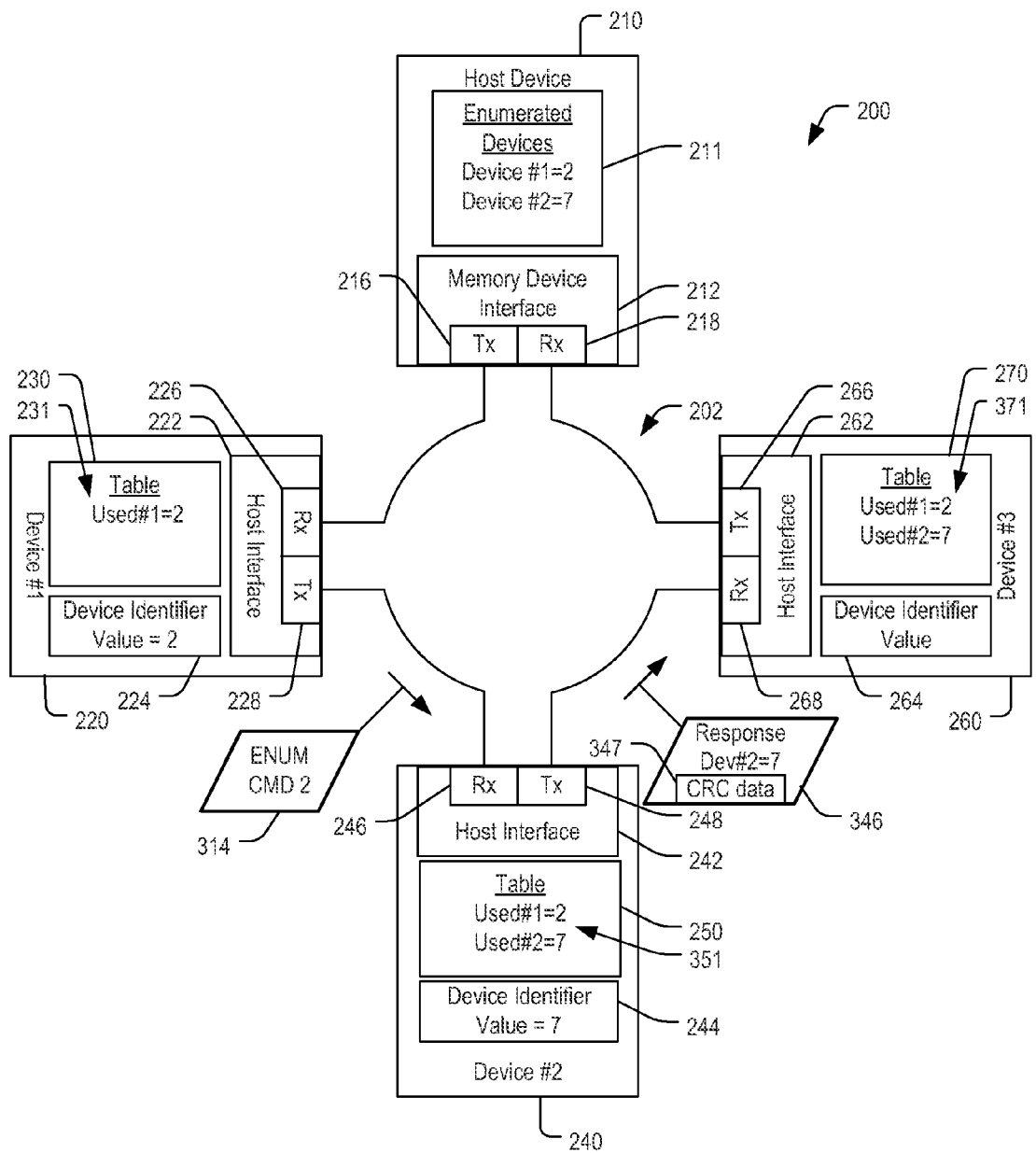
FIG. 3 is a block diagram of the system of FIG. 2 showing a second device response to a second enumeration command.

Referring to FIG. 3, after recording the identifier value of the first device 220, the host device 210 sends a second enumeration command (ENUM CMD 2) 314. The first device 220, having entered the initialization complete state, may forward the second enumeration command 314 to the second device 240 without generating a response.

The second device 240 receives the second enumeration command 314 while the table 250 stores only the used identifier value "2" of the first device 220 and in response to receiving the second enumeration command 314 selects or generates a trial identifier value in a manner similar to the first device 220. For example, the second device 240 may perform a computation using the value "2" at the table 250 to generate a distinctive device identifier value of "7." As another example, the second device 240 may select or generate a trial identifier value of "2" and may compare the trial identifier value to the table 250 and determine that the trial identifier value matches a used identifier value 251 (i.e., "2" is already selected by the first device 220). The second device 240 may select or generate a next trial identifier value of "7" and compare the value "7" to the used identifier value 251 (FIG. 2) stored at the table 250. Upon determining that the trial identifier value of "7" is distinct from the used identifier value 251 (FIG. 1), the second device 240 selects the trial identifier value as the device identifier value 244. After selecting the device identifier value 244 as "7", the second device 240 may also add the value "7" to the table 250 to update stored used identifier values 351. The value "7" may be added to the table 250, for example, so that in case a second enumeration trial is requested of the second device 240 by the host device 210, such as via a command having a Destination ID of "2", the second device 240 can select another identifier value by including "7" as a used identifier value.

The second device 240 may generate a response 346, indicate the host device 210 as the intended recipient of the response 346, and send the response 346 along the communication path 204 to the third device 260. Prior to sending the response 346, the second device 240 may generate CRC data 347 and include the CRC data 347 to the response 346.

The third device 260 receives the response 346 and reads the device identifier value from the response 346. The third device 260 records the device identifier value ("7") to the table 270 to store updated used indicator values 371 and forwards the response 346 to the host device 210. The host device 210 receives the response 346 and records the identifier value of "7" as corresponding to the second device 240. The second device 240 may enter an initialization complete state after sending the response 346.

Figure 4:
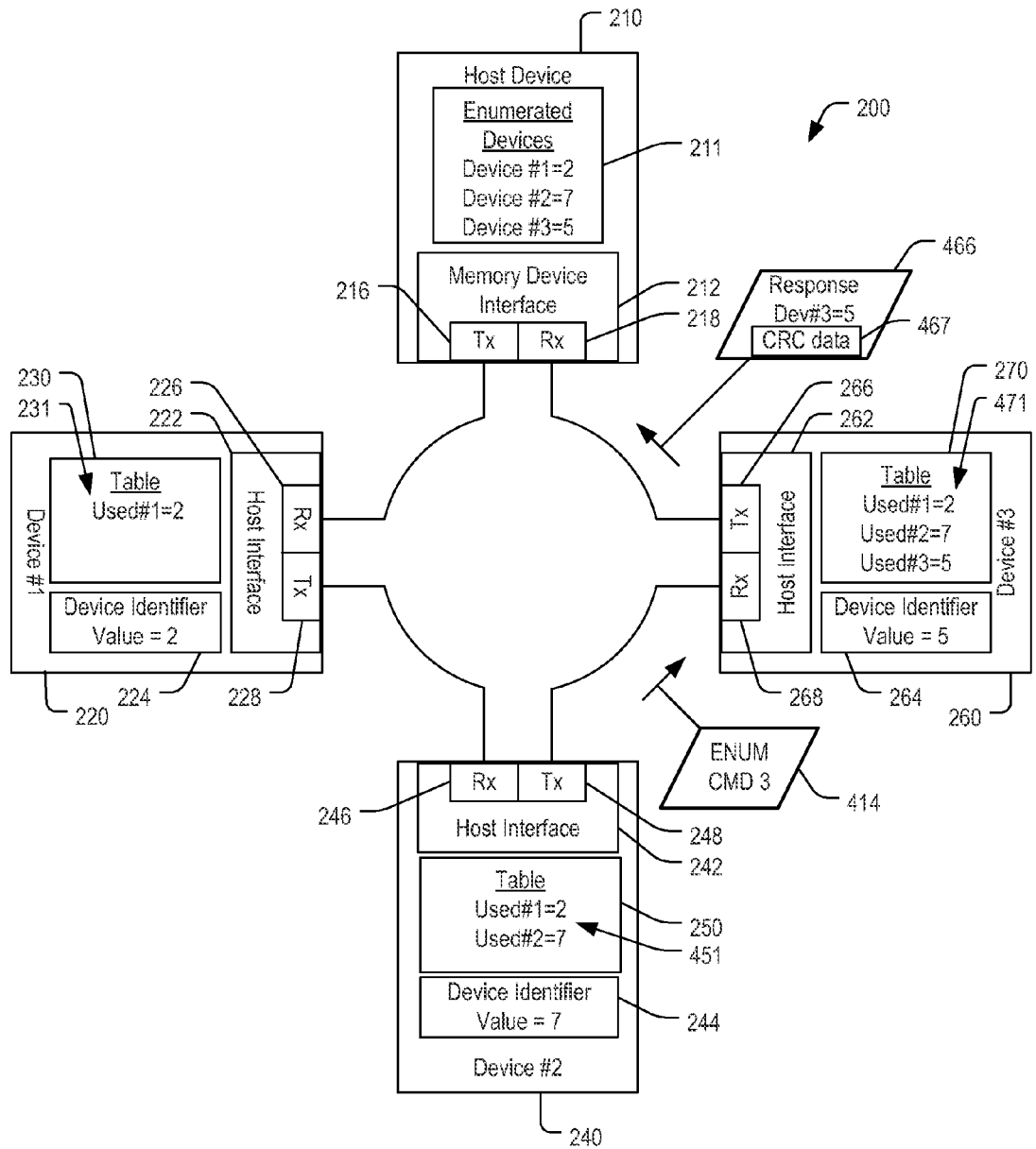
FIG. 4 is a block diagram of the system of FIG. 2 showing a third device response to a third enumeration command.

Referring to FIG. 4, after recording the identifier value of the second device 240, the host device 210 sends a third enumeration command (ENUM CMD 3) 414. The first device 220 and the second device 240, having entered the initialization complete state, may forward the third enumeration command 414 to the third device 260 without generating a response.

The third device 260 receives the third enumeration command 414 and in response selects or generates a distinctive identifier value in a manner similar to the first device 220 and the second device 240. For example, the third device 260 may determine that an identifier value of "5" is distinct from the used identifier values 371 (FIG. 3), and select the identifier value of "5" as the device identifier value 264. The third device 260 may generate a response 466, indicate the host device 210 as the intended recipient of the response 466, and send the response 466 to the host device 210. Prior to sending the response 466, the third device 260 may optionally generate and include CRC data 467 to enable detection of transmission errors. The third device 260 may add the value "5" to the table 270 to update stored used identifier values 471 either prior to or after sending the response 466.

The host device 210 receives the response 466 and records the identifier value of "5" as corresponding to the third device 260. The third device 260 may enter an initialization complete state after sending the response 466. Upon determining that all connected devices have been assigned distinct identifier values, the host device 210 may end the enumeration operation. For example, the host device 210 may send a fourth enumeration message (not shown) and detect that the fourth enumeration message returns to the host device 210, indicating that all devices are in the initialization complete state.

As a result, the enumeration operation is performed with each device 220, 240, and 260 selecting its own distinctive identifier value 224, 244, 264. The enumeration operation efficiently uses transmission cycles ensuring that every device 220, 240, 260 chooses an identifier value that is not already used, thus eliminating extra messaging from the host device 210 instructing devices to re-select identifier values and messaging from the devices to the host device with a next selected identifier value. As a result, the enumeration cycle can be performed efficiently for a large number of devices.

Although three representative devices 220, 240, and 260 are illustrated as coupled to the host device 210 via the memory device network 202, any number of such devices may be coupled to the host device 210 via the memory device network 202. Also, although the memory device network 202 is schematically illustrated as multiple discrete lines connecting the host device 210 and the devices 220, 240, and 260 for ease of explanation, various physical structures may be used to form the memory device network 202 having a ring topology for messaging in a single direction. As one illustrative example, the memory device network 202 may be implemented by a bus that is controlled to emulate a ring topology.

In addition, although described with respect to a ring topology, in other embodiments the memory device network 202 may be implemented using other topologies, such as a tree topology, a star topology, or a linear daisy chain topology. The memory device network may be implemented in one or more other topologies with a communication path between the host device and each device that enables each device to receive prior devices' identifier value selections and to select a distinctive identifier value other than the selected identifier values of the prior devices. An example of a system using a linear daisy chain topology is described with respect to FIG. 5.

Figure 5:
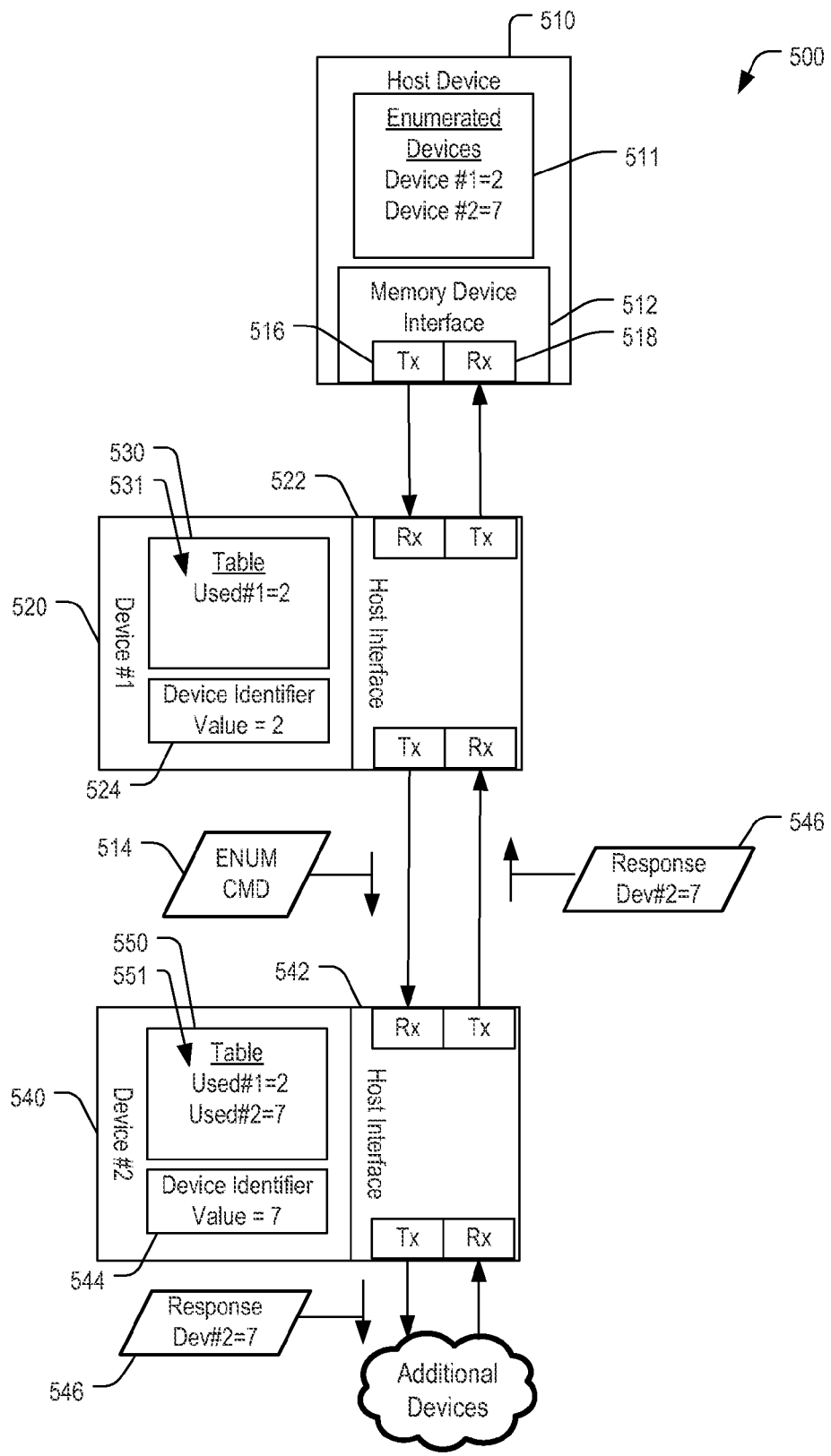
FIG. 5 is a block diagram of a third particular embodiment of a system to select a device identifier value illustrating a first device response to an enumeration command in a linear daisy chain topology.

FIG. 5 is a block diagram of a third particular embodiment of a system to select a device identifier value. The system 500 includes a host device 510 having a table 511 of enumerated devices and a memory device interface 512. The host device 510 is coupled to a first device 520, a second device 540, and one or more additional devices via a memory device network.

The memory device network includes a communication path having a first leg originating at the host device 510 and including the first device 510 at a first position on the communication path, the second device 520 at a second position, and continuing to a last device (not shown) at a last position on the communication path. The communication path also includes a second leg originating at the last device and ending at the host device 510. Messages travel from the host device 510 to the devices 520, 540 along the first leg of the communication path and from the devices 520, 540 to the host device 510 along the second leg of the communication path.

The host device 510 is configured to send messages, such as commands, to the devices 520, 540 via a transmitter circuit 516 of the memory device interface 510. The host device 510 is also configured to receive messages from the devices 520, 540 via a receiver circuit 518 of the memory device interface 512. The host device 510 may operate substantially as described with respect to the host device 210 of FIGS. 2-4.

The first device 520 includes a table 530 to store used indicator value(s) 531 and generates or selects a distinctive device identifier value 524 that is stored at the first device 520. The first device 520 includes a host interface 522 that enables the first device 520 to communicate with the host device 510 via the memory device interface 512 of the host device 510. The host interface 522 includes a first receiver circuit coupled to receive messages from the transmitter circuit 516 of the memory device interface 512 and a first transmitter circuit coupled to send messages to the receiver circuit 518 of the memory device interface 512. The host interface 522 also includes a second transmitter circuit coupled to send messages to the second device 540 and a second receiver circuit coupled to receive messages from the second device 540.

The first device 520 is configured to receive messages, such as commands, from the host device 510 and to determine whether to generate and send a response to the host device 510 or to forward the message to the second device 540. For example, when the first device 520 determines that the first device 520 is an allowed or designated recipient of the message, the first device 520 may generate and send a response to the receiver circuit 518 of the host device 510 and may optionally forward the message to the second device 540, such as when the message indicates multiple recipients. When the first device 520 is not an allowed or designated recipient of the message, such as when a message header indicates one or more designated recipients but does not indicate the first device 520, the first device 520 may forward the message to the second device 540 without generating a response. The first device 520 is also configured to forward messages received from the second device 540 to the receiver circuit 518 of the host device 512.

The second device 540 includes a table 550 to store used indicator value(s) 551 and selects or generates a distinctive device identifier value 544 that is stored at the second device 540. The second device 540 includes a host interface 542 that enables the second device 540 to communicate with the host device 510 via messages forwarded by the first device 520 to and from the memory device interface 512 of the host device 510. The host interface 542 includes a first receiver circuit coupled to receive messages from the second transmitter circuit of the host interface 522 of the first device 520 and a first transmitter circuit coupled to send messages to the second receiver circuit of the host interface 522 of the first device 520. The host interface 542 also includes a second transmitter circuit coupled to send messages to a next device on the first leg of the communication path and a second receiver circuit coupled to receive messages from the next device on the second leg of the communication path.

During operation, the first device 520 responds to a first enumeration command (not shown) from the host device 510 by selecting the distinctive device identifier value 524 of "2" and storing the value of "2" as a used identifier value 531 at the table 530. To enable other devices at later positions along the communication path, such as the second device 524, to receive an indication that the identifier value of "2" is used, the first device 520 sends a response to the first enumeration command to the second device 540 instead of, or in addition to, sending the response directly to the host device 510.

The host device 510 sends a second enumeration command 514 via the transmitter circuit 516 of the memory device interface 512. The first device 520, having already selected the device identifier value 524, forwards the second enumeration command 514 to the second device 540.

The second device 540 receives the enumeration command 514 and in response selects or generates the distinctive device identifier value 544 of "7" to be distinct from the used identifier value of "2" stored in the table 550. The second device 540 records the value of "7" to used identifier values 551 at the table 550. To enable other devices at later positions along the communication path to receive an indication that the identifier value of "7" is used, the second device 540 sends a response 546 indicating the used identifier value of "7" along the first leg of the communication path in a direction away from the host device 510. In a particular embodiment, the second device 540 may also send the response 546 to the first device 520. In an alternative embodiment, the second device 540 may not send the response 546 to the host device 510 and may instead wait until the response 546 is propagated along the first leg of the communication path, reaches the last device on the communication path, and returns via the second leg of the communication path to be forwarded by the second device 540 to the first device 520 and by the first device 520 to the host device 510.

Figure 6:
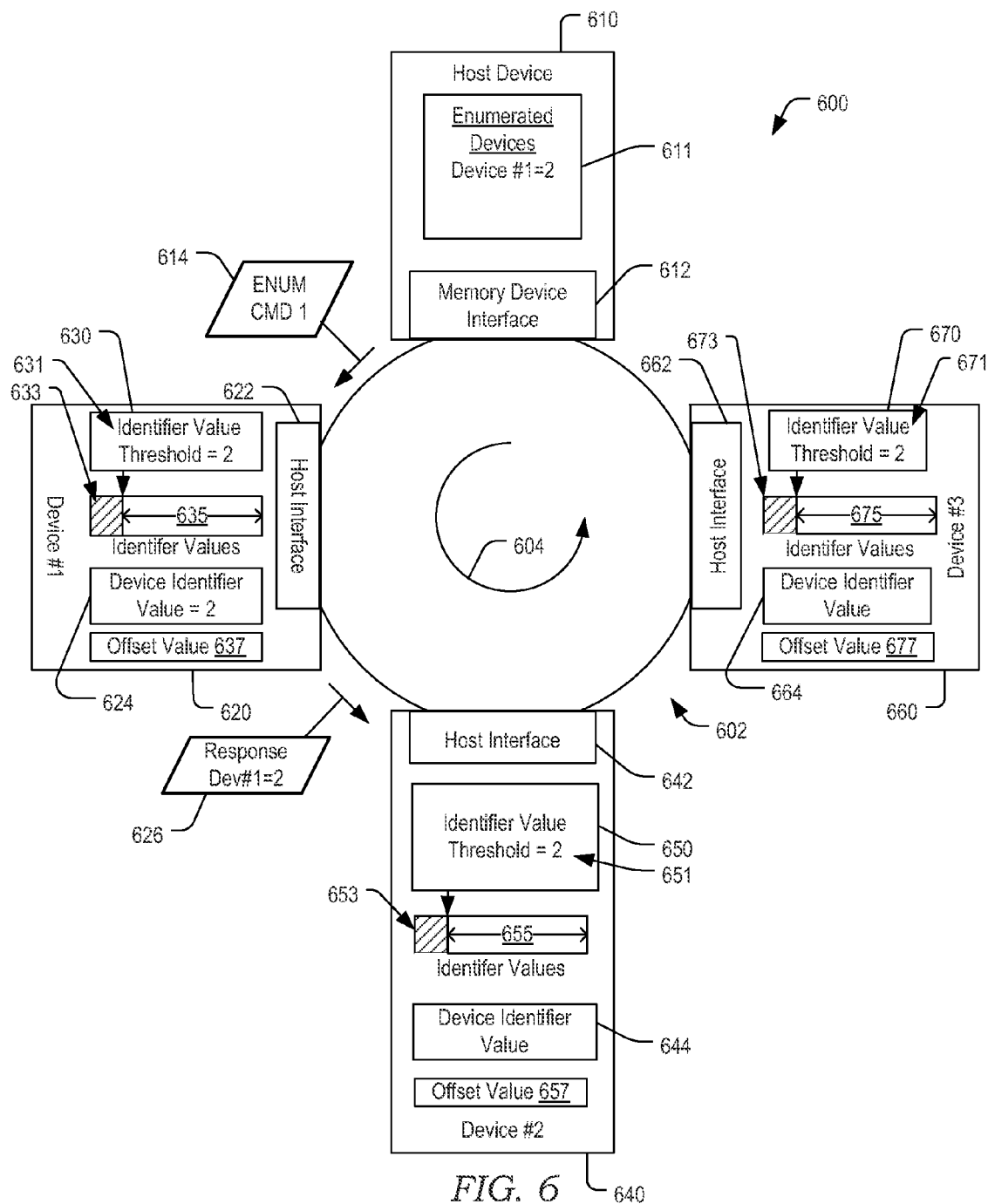
FIG. 6 is a block diagram of a fourth particular embodiment of a system to select a device identifier value illustrating a first device response to a first enumeration command in a ring topology.

FIG. 6 is a block diagram of a fourth particular embodiment of a system to select a device identifier value. The system 600 includes a host device 610 coupled to a representative first device (Device 1) 620, a representative second device (Device 2) 640, and a representative third device (Device 3) 660, via a memory device network 602. Each device 620, 640, and 660 may be configured to store data indicating one or more used identifier values retrieved from responses indicating device identifier value selections of other devices and to select a distinctive identifier value (i.e. an identifier value other than the used identifier values).

The host device 610 includes a storage element, such as a non-volatile memory, a random access memory (RAM), one or more registers, or other tangible storage that is configured to store data corresponding to selected identifier values, illustrated as a table of enumerated devices 611. The host device 610 also includes a memory device interface 612 to enable communication with the devices 620, 640, and 660 via the memory device network 602. As an illustrative example, the host device 610 may correspond to the host device 210 of FIGS. 2-4.

The memory device network 602 may include one or more pairs of differential signaling lines to transmit data between devices. The memory device network 602 has a ring topology and messages travel in a single direction along a communication path 604 around the ring. The first device 620 has a first position on the communication path 604, the second device 640 has a second position on the communication path 604, and the third device 660 has a third position on the communication path 604. The sequential order of the positions of the devices 620, 640, and 660 corresponds to a sequential order that messages travel from device to device along the communication path 604. For example, a message sent by the host device 610 to a destination device may include a device identifier value in the message header to indicate the destination device. Each device 620, 640, and 660 that receives the message may examine the message header to determine whether the device is the intended recipient. If the device is not the intended recipient, the device forwards the message (or a copy of the message) to the next device on the communication path 604. As an illustrative example, the memory device network 602 may correspond to the memory device network 202 of FIGS. 2-4.

The first device 620 includes a host interface 622 configured to receive messages, such as commands and data, from a previous device on the communication path 604, i.e. the host device 610, via the memory device network 602 and to transmit messages, such as responses, to a next device on the communication path 604, i.e. the second device 640 via the memory device network 602.

The first device 620 includes one or more storage elements, such as one or more of a non-volatile memory, a random access memory (RAM), one or more registers, or other tangible storage, or any combination thereof, that are configured to store data corresponding to threshold identifier value. The storage devices are illustrated as a used identifier value storage 630 storing a used identifier value as an identifier value threshold 631. The first device 620 also includes a device identifier tangible storage to store a device identifier value 624 of the first device 620. The first device 620 may include one or more controllers, memory arrays, wireless transceivers, or any combination thereof, as described with respect to FIG. 11 and FIG. 15-18. As an illustrative example, the first device 620 may correspond to the memory device 120 of FIG. 1 or the first device 220 of FIGS. 2-4.

The first device 620 is configured to receive an enumeration message via the host interface 622 and to identify the received enumeration message as a command originated by the host device 610, such as a first enumeration command (ENUM CMD 1) 614 sent by the host device 610, or as a response message. For example, the first device 620 may read header information of a received message and determine a message type based on a message type indicator included in the header information that indicates whether the message is a command or a response message. In response to identifying the enumeration message as the response message, the device 620 may be configured to read an identifier value indicated as used by another device from the response message and store, at least temporarily, the used identifier value at the used identifier value storage 630 as the identifier value threshold 631. As an example, the first device 620 may be configured to accumulate multiple used identifier values that are received via one or more response messages at the used identifier value storage 630 and to use a most recently stored identifier value as the identifier value threshold 631. As another example, the first device 620 may be configured to replace a stored used identifier value at the used identifier value storage 630 with the identifier value read from the response message.

In response to identifying the enumeration message as a command, the first device 620 is configured to selectively initiate sending of an enumeration response message indicating the distinctive device identifier value 624 to the host device 610. For example, upon determining that the enumeration message is a command, the first device 620 may select the distinctive device identifier value 624 by adding an offset value 637 to a most recently stored used identifier value (i.e. the identifier value threshold) at the used identifier value storage 630 to generate a result that is greater than the most recently stored used identifier value. As another example, the first device 620 may select the distinctive device identifier value 624 by subtracting the offset value 637 to a most recently stored used identifier value (i.e. the identifier value threshold 631) at the used identifier value storage 630 to generate a result that is less than the identifier value threshold 631. The offset value 637 may be selected by the first device 620, such as a randomly or pseudo-randomly generated number. Alternatively, the offset value 637 may be determined by a device manufacturer, such as stored at the first device 620 to have a value of "1" or "2" as illustrative, non-limiting examples.

As another example, the first device 620 may be configured to use the most recently stored used identifier value (i.e. the identifier value threshold 631) at the used identifier value storage 630 as a threshold value that defines a non-allowed identifier range of values 633 and an allowed identifier range of values 635 and may select the distinctive device identifier value 624 to be within the allowed identifier range of values 635. To illustrate, the first device 620 may generate a random or pseudo-random value that corresponds to a value within the allowed identifier range of values 635. As another illustrative example, the first device 620 may select a value from a table of selectable values (not shown) such that the selected value is the lowest value within the table of selectable values and also within the allowed identifier range of values 635. As another illustrative example, the first device 620 may perform a calculation to determine a value that is within the allowed identifier range of values 635, such as by adding the offset value 637 to a value in the non-allowed identifier range of values 633 to select an identifier value within the allowed identifier range of values 635.

When each device in the enumeration process uses a most recently received used identifier value as a threshold to select or generate a device identifier value, each device ensures that its selected device identifier value is distinct from all other identifier values that are indicated as used. After selecting or generating the distinctive device identifier value 624, the first device 620 is configured to generate and send an enumeration response message, such as a response 626, to the host. The response 626 indicates the distinctive device identifier value 624 and is transmitted to the next device on the communication path for eventual delivery to the host device 610 via one or more other devices (e.g. the second device 640 and the third device 660). The response 626 may optionally include error detection data that enables the host device 610 to detect an occurrence of one or more errors that occur as the response 626 is routed to the host device 610, as described with respect to FIGS. 2-4.

The first device 620 may not respond to all received enumeration messages identified as commands by selecting the distinctive device identifier value 624 and sending a response. For example, a command received at the first device 620 is forwarded without sending an enumeration response message in response to the first device 620 determining that the command indicates one or more recipients but does not indicate the first device 620 as a recipient. To illustrate, the first device 620 may read header information of the command that indicates one or more device identifier values but that does not match the distinctive device identifier value 624 of the first device 620. In this case, the first device 620 forwards the command to the second device 640 without sending a response message to the host 610.

The second device 640 includes a host interface 642 and one or more storage elements such as one or more of a non-volatile memory, a random access memory (RAM), one or more registers, or other tangible storage, or any combination thereof, that is configured to store data corresponding to identifier values that have been selected by a device. The storage elements are illustrated as a used identifier value storage 650 storing one or more used identifier values as an identifier value threshold 651. The second device 640 may also store an offset value 657. The second device 640 may be configured to use the identifier value threshold 651 as a threshold value that defines a non-allowed identifier range of values 653 and an allowed identifier range of values 655. The second device 640 also includes a device identifier tangible storage to store a distinctive device identifier value 644 of the second device 640.

The third device 660 includes a host interface 662 and includes one or more storage elements such as one or more of a non-volatile memory, a random access memory (RAM), one or more registers, or other tangible storage, or any combination thereof, that is configured to store data corresponding to identifier values that have been selected by a device. The storage elements are illustrated as a used identifier value storage 670 storing one or more used identifier values as an identifier value threshold 671. The third device 660 may also store an offset value 677. The third device 660 may be configured to use the identifier value threshold 671 as a threshold value that defines a non-allowed identifier range of values 673 and an allowed identifier range of values 675. The third device 660 also includes a device identifier tangible storage to store a distinctive device identifier value 664 of the third device 660.

The second device 640, the third device 660, or any combination thereof, may include one or more controllers, memory arrays, wireless transceivers, or any combination thereof. The second device 640 and the third device 660 may be configured to operate in a substantially similar manner as the first device 620 during a device enumeration operation.

During operation, the host device 610 may send a first enumeration command (ENUM CMD 1) 614 over the communication path 604 and the first enumeration command 614 is received by the first device 620. The first enumeration command 614 may be sent as part of an enumeration operation that the host device 610 initiates during an initialization process. Each device 620, 640, and 660 may be in an initialization state that causes the devices 620, 640, and 660 to be responsive to enumeration commands and to other devices' responses to enumeration commands. Each device 620, 640, and 660 may be initialized to have an empty used identifier value storage 630, 650, 670 and no selected device identifier value 624, 644, 664. As an example, the host device 610 may initiate a power-up event to the devices 620, 640, and 660 by providing power via the memory device network 602, and in response to detecting the power-up event, each device 620, 640, and 660 may enter an initialization state.

The first device 620 may receive the first enumeration command 614. In response, the first device 620 may access the used identifier value storage 630 and perform a computation to generate a distinctive device identifier value 624 of "2." For example, the first device 620 may add the offset value 627 of "2" to the identifier value threshold 631, which may be initialized to a "0" value to generate the result "2." Alternatively, the first device 620 may use the identifier value threshold 631 to define an allowed identifier range of values select a trial identifier value of "2" from an allowed identifier range of values. For example, the first device 620 may generate a random identifier value, select an identifier value from a table, or use a pre-set initial identifier value, as illustrative, non-limiting examples. The first device 620 may generate the response 626 indicating the distinctive device identifier value as "2" and indicating the host device 610 as the intended recipient of the response 626 and may send the response 626 along the communication path 604 to the second device 640. Prior to sending the response 626, the first device 620 may optionally perform a CRC operation on data included in the response 626 and include the resulting CRC data in the response 626 to enable detection of one or more transmission errors. The first device 620 may update the identifier value threshold 631, the non-allowed identifier range of values 633, and the allowed identifier range of values 635.

The second device 640 receives the first response 626 and reads the device identifier value 624 ("2") from the response 626. The second device 640 records the device identifier value 624 ("2") to the used identifier value storage 650 as an identifier value threshold 651 and forwards the response 626 to the third device 660. The second device 640 may use the identifier value threshold 651 to define the non-allowed identifier range of values 653 and the allowed identifier range of values 655. The third device 660 similarly reads the response 626 and records the device identifier value 624 ("2") as the identifier value threshold 671, and forwards the reply 626 to the host device 610. The third device 660 may use the identifier value threshold 671 to define an updated non-allowed identifier range of values 673 and an updated allowed identifier range of values 675.

The host device 610 receives the response 626 and records the identifier value of "2" as corresponding to the first device 620. The first device 620 may enter an initialization complete state upon sending the response 626, as one example, or as another example the first device 620 may enter the initialization complete state upon receiving a signal from the host device 610 that the identifier value has been accepted.

Figure 7:
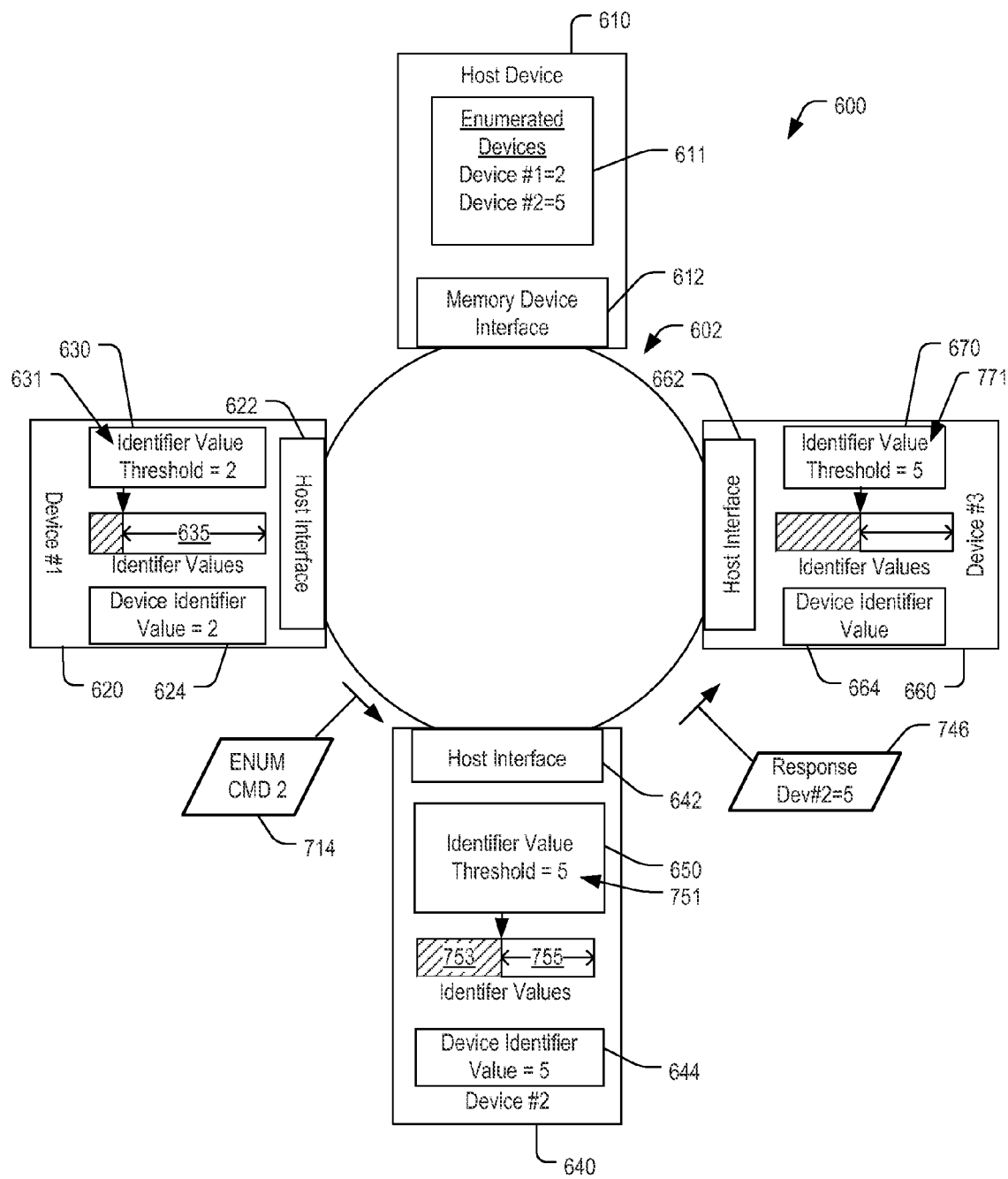
FIG. 7 is a block diagram of the system of FIG. 6 showing a second device response to a second enumeration command.

Referring to FIG. 7, after recording the identifier value of the first device 620, the host device 610 sends a second enumeration command (ENUM CMD 6) 714. The first device 620, having entered the initialization complete state, may forward the second enumeration command 714 to the second device 640 without generating a response.

The second device 640 receives the second enumeration command 714 and in response selects or generates a distinctive identifier value in a manner similar to the first device 620. For example, the second device 640 may add the offset value 657 to the identifier value threshold 651 to generate a distinctive device identifier value of "5." As another example, the second device 640 may select or generate the value of "5" as within the allowed identifier range of values 655. The second device 640 stores the value "5" the distinctive device identifier value 644. The second device 640 may use the identifier value threshold 751 to define an updated non-allowed identifier range of values 753 and an updated allowed identifier range of values 755.

The second device 640 may generate a response 746, indicate the host device 610 as the intended recipient of the response 746, and send the response 746 along the communication path 604 to the third device 660. The second device 640 may also add the value "5" to the used identifier value storage 650 to update an identifier value threshold 751. Prior to sending the response 746, the second device 640 may generate and include CRC data in the response 746.

The third device 660 receives the response 746 and reads the device identifier value from the response 746. The third device 660 records the device identifier value 644 ("5") to the used identifier value storage 670 to store an updated indicator value threshold 771 and forwards the response 746 to the host device 610. The host device 610 receives the response 746 and records the identifier value of "5" as corresponding to the second device 640. The second device 640 may enter an initialization complete state after sending the response 746.

Figure 8:
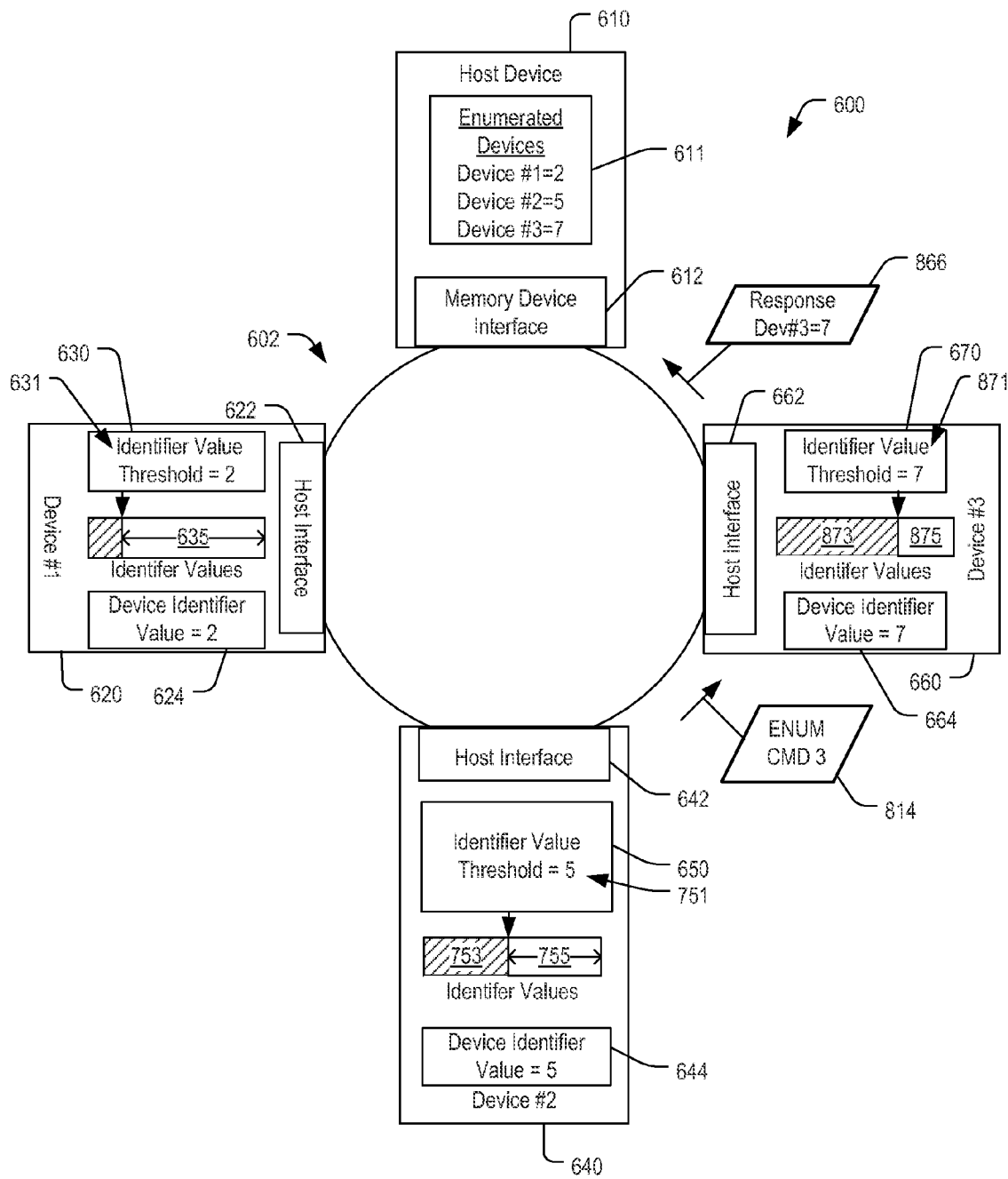
FIG. 8 is a block diagram of the system of FIG. 6 showing a third device response to a third enumeration command.

Referring to FIG. 8, after recording the identifier value of the second device 640, the host device 610 sends a third enumeration command (ENUM CMD 3) 814. The first device 620 and the second device 640, having entered the initialization complete state, may forward the third enumeration command 814 to the third device 660 without generating a response.

The third device 660 receives the third enumeration command 814 and in response selects or generates a distinctive identifier value in a manner similar to the first device 620 and the second device 640. For example, the third device 660 may determine that an identifier value of "7" is distinct from all identifier values indicated as used based on the identifier value threshold 771 of FIG. 7, and select the identifier value of "7" as the device identifier value 664. The third device 660 may generate a response 866, indicate the host device 610 as the intended recipient of the response 866, and send the response 866 to host device 610. Prior to sending the response 866, the third device 660 may optionally generate and include CRC data to enable detection of error occurrence during transmission. The third device 660 may also add the value "7" to the used indicator value storage 670 as an updated identifier value threshold 871. The third device 660 may use the identifier value threshold 871 to define an updated non-allowed identifier range of values 873 and an updated allowed identifier range of values 875.

The host device 610 receives the response 866 and records the identifier value of "7" as corresponding to the third device 660. The third device 660 may enter an initialization complete state after sending the response 866. Upon determining that all connected devices have been assigned distinctive identifier values, the host device 610 may end the enumeration operation. For example, the host device 610 may send a fourth enumeration message (not shown) and detect that the fourth enumeration message returns to the host device 610, indicating that all devices are in the initialization complete state.

As a result, the enumeration operation is performed with each device 620, 640, and 660 selecting its own distinct identifier value 624, 644, 664 using a most recently received used identifier value (if any) as a threshold value to ensure each device selects a distinctive device identifier value. The enumeration operation efficiently uses transmission cycles by ensuring that each device 620, 640, 660 chooses an identifier value that is already used, thus eliminating extra messaging from the host device 610 instructing devices to re-select identifier values and messaging from the devices to the host device with a next selected identifier value. As a result, the enumeration cycle can be performed efficiently for a large number of devices.

Although three representative devices 620, 640, and 660 are illustrated coupled to the host device 610 via the memory device network 602, any number of devices may be coupled to the host device 610 via the memory device network 602. Also, although the memory device network 602 is schematically illustrated as multiple discrete lines connecting the host device 610 and the devices 620, 640, and 660 for ease of explanation, various physical structures may be used to form the memory device network 602 having a ring topology for messaging in a single direction. As one illustrative example, the memory device network 602 may be implemented by a bus that is controlled to emulate a ring topology.

In addition, although described with respect to a ring topology, in other embodiments the memory device network 602 may be implemented using other topologies, such as a tree topology, a star topology, or a linear daisy chain topology (similar to the system 500 of FIG. 5). A communication path between the host device and each device enables each device to receive prior devices' identifier value selections and to select a distinctive identifier value other than the selected identifier values of the prior devices.

Figure 9:
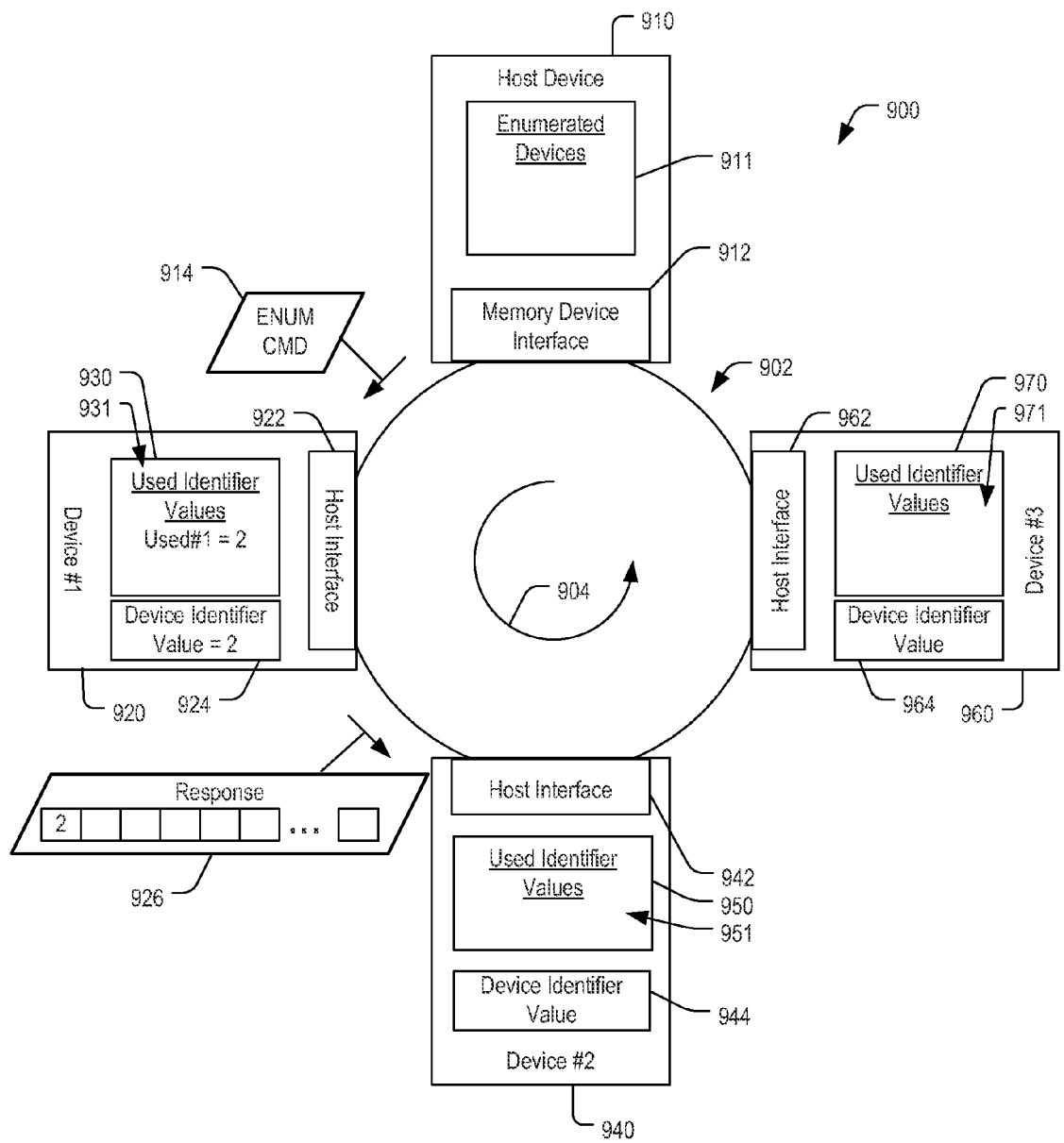
FIG. 9 is a block diagram of a fifth particular embodiment of a system to select a device identifier value illustrating a response to an enumeration command by a first device in a ring topology.

FIG. 9 is a block diagram of a fifth particular embodiment of a system to select a device identifier value. The system 900 includes a host device 910 coupled to a representative first device (Device 1) 920, a representative second device (Device 2) 940, and a representative third device (Device 3) 960, via a memory device network 902. Each device 920, 940, and 960 may be configured to store data indicating one or more used identifier values retrieved from responses indicating device identifier value selections of other devices and to select a distinct identifier value (i.e. an identifier value other than the used identifier values).

The host device 910 includes a storage element, such as a non-volatile memory, a random access memory (RAM), one or more registers, or other tangible storage that is configured to store data corresponding to selected identifier values, illustrated as a table of enumerated devices 911. The host device 910 also includes a memory device interface 912 to enable communication with the devices 920, 940, and 960 via the memory device network 902. As an illustrative example, the host device 910 corresponds to the host device 210 of FIG. 2, the memory device network 902 corresponds to the memory device network 202 of FIG. 2, and a communication path 904 corresponds to the communication path 204 of FIG. 2.

The first device 920 includes a host interface 922 and includes one or more storage elements, such as one or more of a non-volatile memory, a random access memory (RAM), one or more registers, or other tangible storage, or any combination thereof, that is configured to at least temporarily store data corresponding to used identifier values that have been selected by one or more devices. The storage elements are illustrated as a table 930 storing one or more used identifier values 931. The first device 920 also includes a device identifier tangible storage to store a device identifier value 924 of the first device 920. The first device 920 may include one or more controllers, memory arrays, wireless transceivers, or any combination thereof, as described with respect to FIG. 11 and FIGS. 15-18. As an illustrative example, the first device 920 may correspond to the memory device 220 of FIG. 2.

As described below, each of the devices 920, 940, and 960 may receive data indicating all used identifiers in a single message. As a result, each device may read the used identifiers into one or more temporary buffers or RAM to generate a distinctive identifier value without continuing to store the used identifier values after the device selects its own distinctive identifier value. Tables 930, 950, and 970 are illustrated for ease of explanation and may not correspond to actual data structures in the devices.

The first device 920 is configured to receive an enumeration message via the host interface 922 and to identify the received enumeration message as a command originated by the host device 910, such as a first enumeration command (ENUM CMD 1) 914 sent by the host device 910, or as a response message. For example, the first device 920 may read header information of a received message and determine a message type based on a message type indicator included in the header information that indicates whether the message is a command or a response message. In response to identifying the enumeration message as the response message, the device 920 may be configured to read one or more identifier values from the response message and may store, at least temporarily, the read identifier value(s) at the table 930 as used by another device coupled to the memory device interface 912 of the host device 910. The first device 920 may be configured to accumulate multiple used identifier values at the table 930 that are received via a single response message.

The first device 920 may be configured, upon identifying the enumeration message as the response message, to select a device identifier value that is distinctive from each used identifiers read from the response message and to generate a second response message that includes each used identifier value identified by the response message and that also includes the distinctive device identifier value. The first device 920 may select a distinctive identifier value using one or more of the identifier value selection techniques described with respect to the first device 220 of FIG. 2. As described further below, the received response message may include a used identifier value of each device (if any) that has a corresponding position on the communication path 904 between the host device 910 and a position of the first device 920. The first device 920 may be configured to generate the second response message by adding the distinctive device identifier value to a first unused field of a set of device identifier fields in the response message. The first device 920 may forward the response message including the distinctive device identifier value along the communication path 904 to the host device 910.

In response to identifying the enumeration message as a command, the first device 920 is configured to selectively initiate sending of an enumeration response message, such as a response 926, indicating the distinctive device identifier value 924 to the host device 910. The response 926 includes a set of device identifier fields and includes the distinctive device identifier value in a first sequential field, indicating the first device's relative position along the communication path 904 (i.e., the first position to receive messaging from the host 910). The set of device identifier fields may include at least as many fields as a maximum allowed number of devices that can be coupled to the memory device interface 912. The first device 920 transmits the response 926 to the next device on the communication path for eventual delivery to the host device 910 via one or more other devices (e.g. the second device 940 and the third device 960). The response 926 may optionally include error detection data that enables the host device 910 to detect an occurrence of one or more errors that occur as the response 926 is routed to the host device 910, such as CRC data (not shown).

The first device 920 may not respond to all received enumeration messages identified as commands by selecting the distinctive device identifier value 924 and sending a response. For example, a command received at the first device 920 is forwarded without sending an enumeration response message in response to the first device 920 determining that the command indicates one or more recipients but does not indicate the first device 920 as a recipient.

The second device 940 includes a host interface 942 and one or more storage elements, such as one or more of a non-volatile memory, a random access memory (RAM), one or more registers, or other tangible storage, or any combination thereof, that is configured to store data corresponding to identifier values that have been selected by a device. The storage elements are illustrated as a table 950 storing one or more used identifier values 951. The second device 940 also includes a device identifier tangible storage to store a distinctive device identifier value 944 of the second device 940.

The third device 960 includes a host interface 962 and one or more storage elements, such as one or more of a non-volatile memory, a random access memory (RAM), one or more registers, or other tangible storage, or any combination thereof, that is configured to store data corresponding to identifier values that have been selected by a device. The storage elements are illustrated as a table 970 storing one or more used identifier values 971. The third device 960 also includes a device identifier tangible storage to store a distinctive device identifier value 964 of the third device 960.

The second device 940, the third device 960, or any combination thereof, may include one or more controllers, memory arrays, wireless transceivers, or any combination thereof. The second device 940 and the third device 960 may be configured to operate in a substantially similar manner as the first device 920 during a device enumeration operation.

During operation, the host device 910 may send a first enumeration command (ENUM CMD 1) 914 over the communication path 904 and the first enumeration command 914 is received by the first device 920. The first enumeration command 914 may be sent as part of an enumeration operation that the host device 910 initiates during an initialization process as described with respect to FIGS. 2-4 and FIGS. 6-8.

The first device 920 may receive the first enumeration command 914. In response, the first device 920 generate a device identifier value of "2" and store the generated identifier value as the distinctive device identifier value 924. In addition, the first device 920 may optionally update the table 930. The first device 920 may generate the response 926, indicate the host device 910 as the intended recipient of the response 926, indicate the distinctive device identifier value 924 of "2" in a first sequential identifier field of the response 926, and send the response 926 along the communication path 904 to the second device 940. Prior to sending the response 926, the first device 920 may optionally include error detection data such as CRC data to the response 926.

Figure 10:
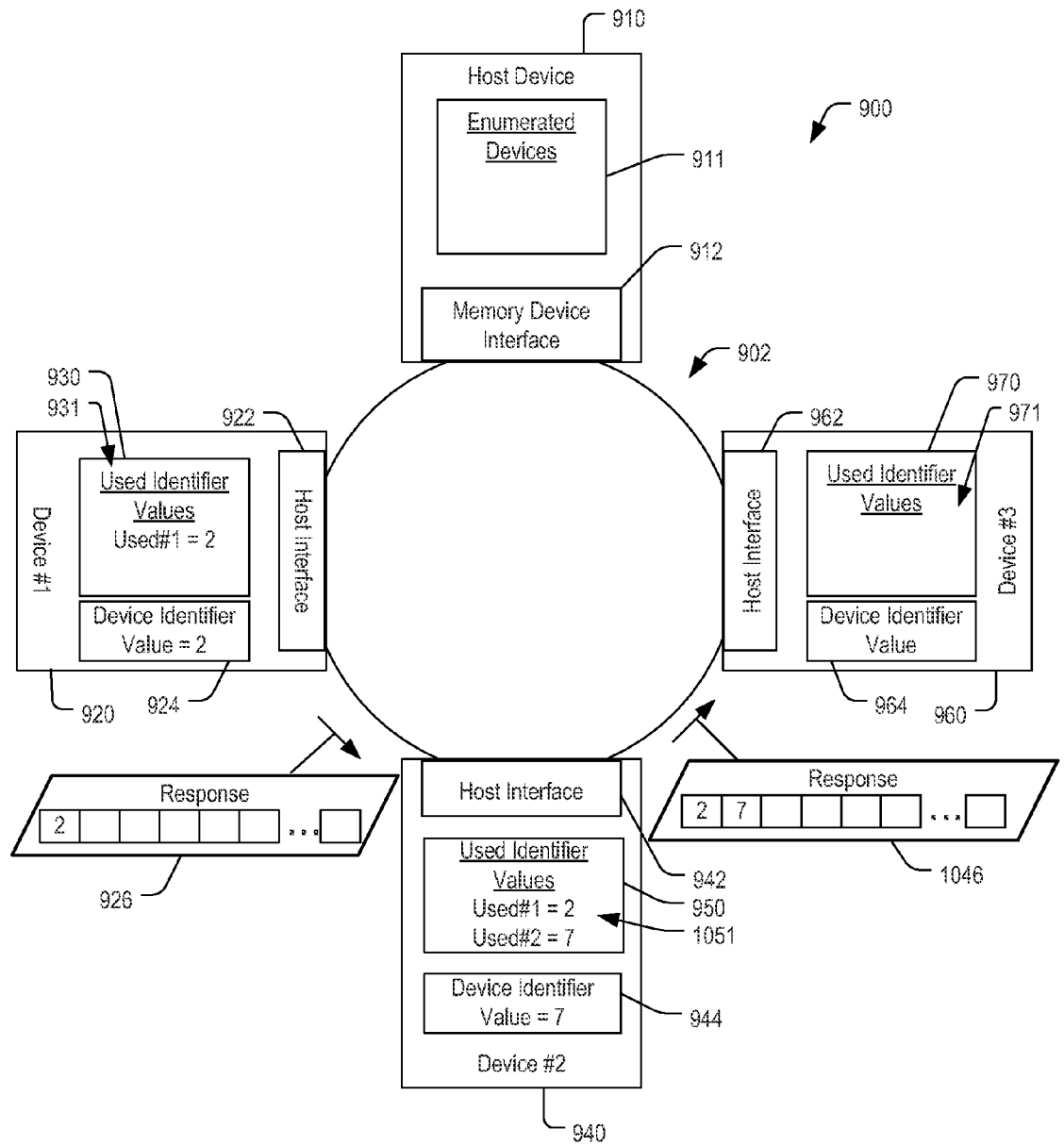
FIG. 10 is a block diagram of the system of FIG. 9 illustrating a modification of the response by a second device.

Referring to FIG. 10, the second device 940 receives the response 926 and reads the used identifier value 924 of "2" from the response. The second device 940 may add the used identifier value 924 of "2" to the table 950 and selects or generates a distinctive identifier value of "7" in a manner similar to the first device 920. The second device 940 stores the generated identifier value as the distinctive device identifier value 944. The second device 940 may update the table 950 to include updated used identifier values 1051. The second device 940 generates a second response 1046 that includes the device identifier value 924 ("2") of the first device 920 in the first sequential identifier field and the distinctive device identifier value 944 ("7") in a first unused identifier field, i.e., the second sequential identifier field. The second device 940 may indicate the host device 910 as the intended recipient of the second response 1046 and send the response 1046 along the communication path 904 to the third device 940. Prior to sending the response 1046, the second device 940 may include error detection data, such as CRC data, in the response 1046.

Figure 11:
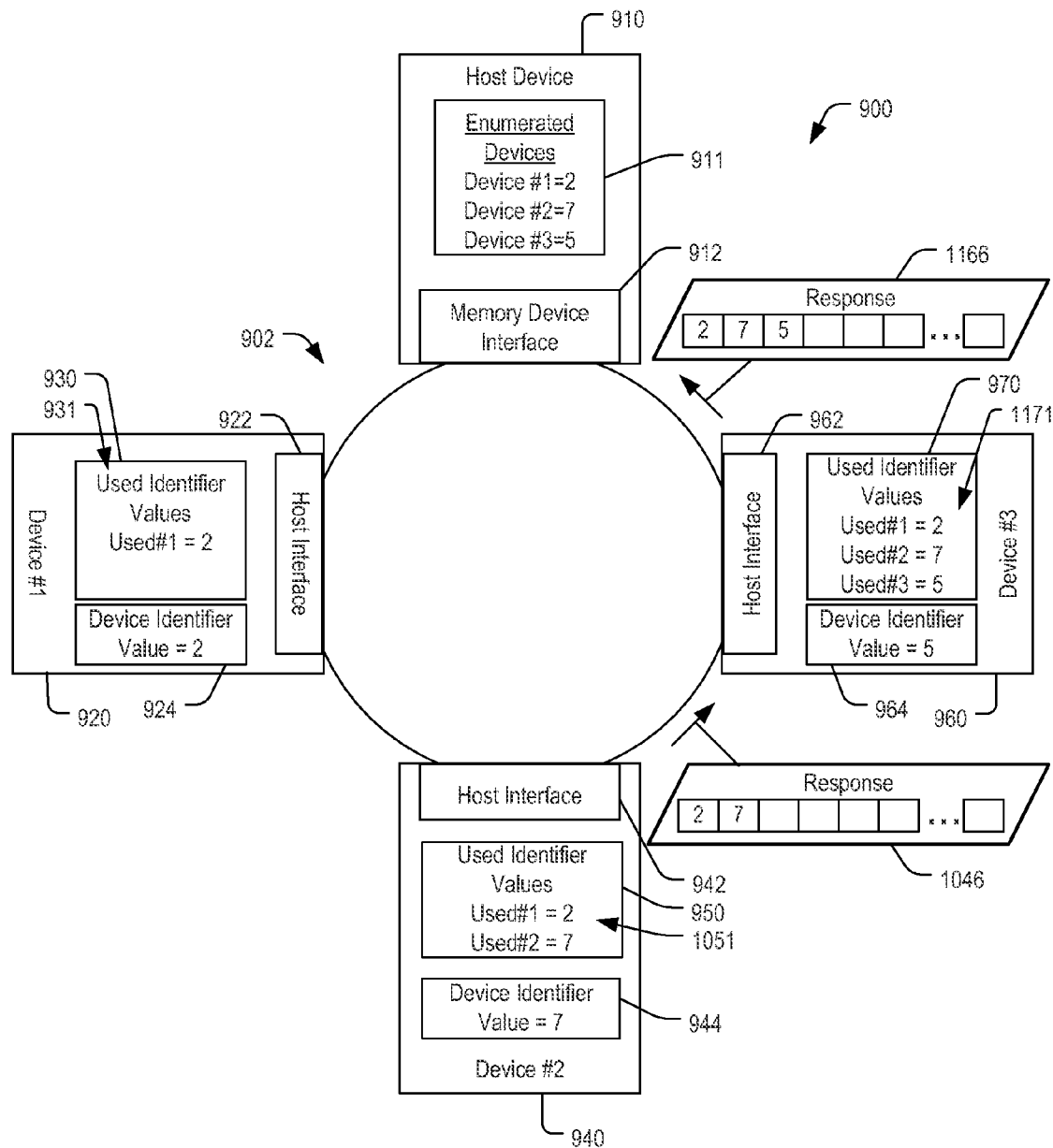
FIG. 11 is a block diagram of the system of FIG. 9 illustrating a modification of the response by a third device.

Referring to FIG. 11, the third device 960 receives the response 1046 and reads the used identifier values of "2" and "7" from the response 1046. The third device 960 may add the used identifier values of "2" and "7" to the table 970 and selects or generates a distinctive identifier value of "5" in a manner similar to the first device 920. The third device 960 stores the generated identifier value of "5" as the distinctive device identifier value 964 and may update the table 970 to include updated used identifier values 1171. The third device 960 generates a third response 1166 that includes the device identifier value "2" of the first device 920 in the first sequential identifier field, the device identifier value "7" of the second device 940 in the second sequential identifier field, and the distinctive device identifier value 964 of "5" in a first unused identifier field, i.e., the third sequential identifier field. The third device 960 may indicate the host device 910 as the intended recipient of the response 1166 and send the response 1166 along the communication path 904 to the host device 910. Prior to sending the response 1166, the third device 960 may include error detection data, such as CRC data, in the response 1166.

As a result, the enumeration operation is performed with the host device 910 sending a single enumeration command. The first device 920 generates the response 926 and each other device on the communication path 904 (e.g. the second device 940 and the third device 960) receives a single response that indicates all identifier values used by devices having earlier positions on the communication path 904. Each device selects its own distinctive identifier value, adds the selected distinctive identifier value to the next unused identifier field, and forwards the response to a next device on the communication path 904. The enumeration operation efficiently uses transmission cycles by ensuring that each device 920, 940, 960 chooses an identifier value that is not already used, thus eliminating extra messaging from the host device 910 instructing devices to re-select identifier values and messaging from the devices to the host device with a next selected identifier value. As a result, the enumeration cycle can be performed efficiently for a large number of devices, with the host device 910 sending a single command and receiving a single response that includes a set of all selected identifier values, and the identifier values in the response are ordered according to each device's position along the communication path 904.

Although three representative devices 920, 940, and 960 are illustrated as coupled to the host device 910 via the memory device network 902, any number of devices may be coupled to the host device 910 via the memory device network 902. In addition, although described with respect to a ring topology, in other embodiments the memory device network 902 may be implemented using other topologies, such as a tree topology, a star topology, or a linear daisy chain topology. A communication path between the host device and each device enables each device to receive prior devices' identifier value selections and to select a distinctive identifier value other than the selected identifier values of the prior devices.

Elements of the system 200 described with respect to FIGS. 2-4, the system 600 described with respect to FIGS. 6-9, the system 900 described with respect to FIGS. 9-11, or any combination thereof, may be combined in a single system. For example, the devices 920, 940, and 960 of FIG. 9 may further be configured to use a received used identifier value as a threshold value that defines an allowed identifier range of values and to select a distinctive device identifier value to be within the allowed identifier range of values in a manner similar to the devices 620, 640, and 660 of FIG. 6, in addition to the selected device identifier being distinct from each used identifier value received in a response message. To illustrate, the host device 910 may receive the response 1166 and make a determination to repeat the enumeration process. For example, the host device 910 may also be coupled to second ring of devices (not shown) and an identifier value included in the response 1166 may conflict with an identifier value from the second ring of devices. The host device 910 may generate a command to cause the devices 920, 940, and 960 to re-select distinctive identifier values. The host device may include in the command an identifier value threshold based on identifier values of devices on the second ring, to ensure that each of the devices 920, 940, and 960 selects an identifier value distinct from each other and also distinct from identifier values of devices on the second ring. As another example, the host device 910 may include in the command a list of parameters indicating identifier values selected by other devices and may broadcast or address the command to one or more of the devices 920, 940, and 960 to enable re-selection of device identifiers that are globally distinctive (i.e. distinct from identifiers of all devices coupled to the host device).

Figure 12:
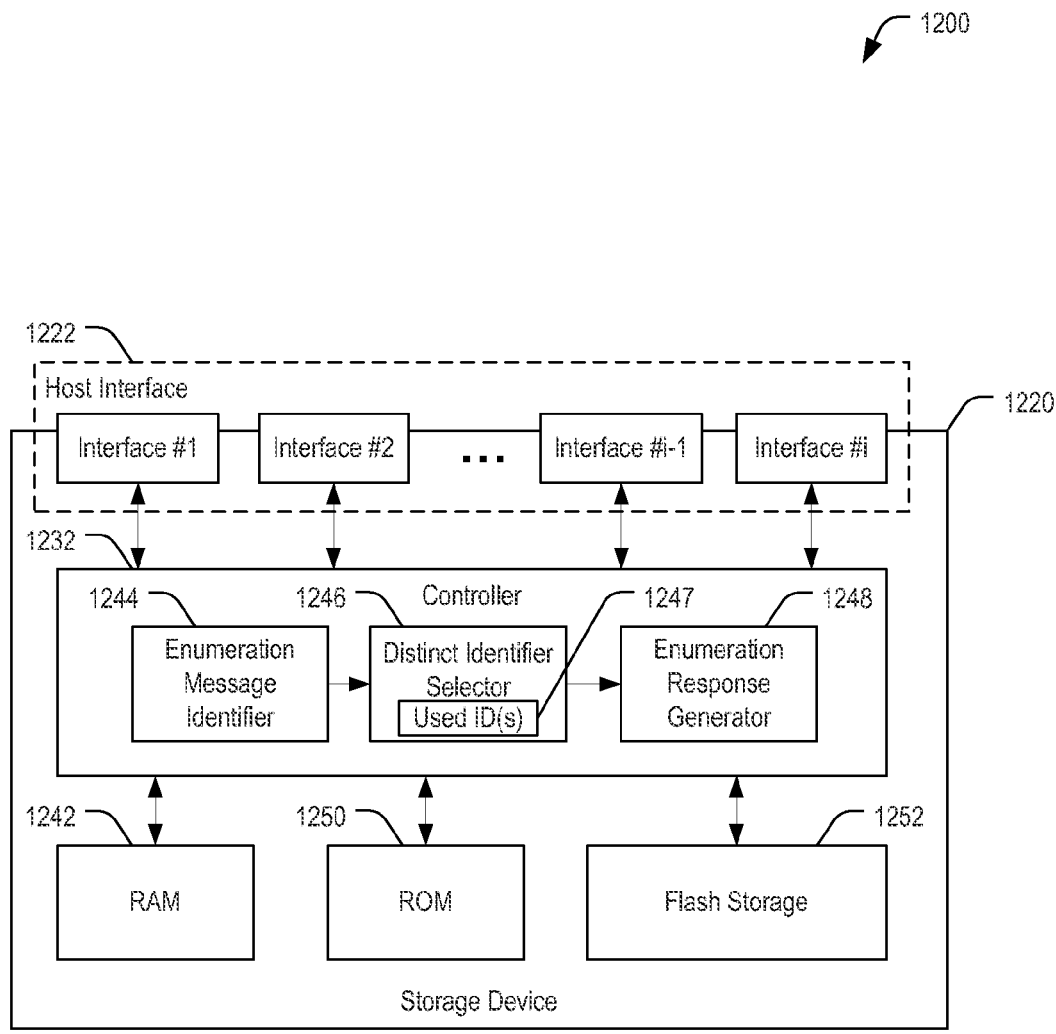
FIG. 12 is a block diagram of a sixth particular embodiment of a system to select a device identifier value.

FIG. 12 is a block diagram of a sixth particular embodiment of a system to select a device identifier value. The system 1200 includes a storage device 1220 having multiple interfaces coupled to a controller 1232. The controller 1232 is coupled to a Random Access Memory (RAM) 1242, a Read Only Memory (ROM) 1250, and a flash storage 1252. The storage device 1220 may correspond to the memory device 120 of FIG. 1, one or more of the devices 220, 240, and 260 of FIGS. 2-4, one or more of the devices 520 and 540 of FIG. 5, one or more of the devices 620, 640, and 660 of FIGS. 6-8, one or more of the devices 920, 940, and 960 of FIGS. 9-11, or any combination thereof.

As illustrated, the storage device 1220 may include any number "i" of interfaces. One or more of the interfaces may be unidirectional, such as input only or output only, or bidirectional supporting input and output messaging. One or more of the multiple interfaces may be configured to operate as a host interface 1222 and may include one or more dedicated input interfaces and one or more dedicated output interfaces that enable the host interface 1222 to operate similarly to the transmitter circuits and the receiver circuits of the host interface 222 of the first device 220 of FIG. 2 and the transmitter circuits and receiver circuits the host interface 522 of the first device 520 of FIG. 5.

The controller 1232 includes an enumeration message identifier 1244, a distinct identifier selector 1246, and an enumeration response generator 1248. One or more of the enumeration message identifier 1244, the distinct identifier selector 1246, and the enumeration response generator 1248 may be implemented as program instructions executed at the controller 1232, as firmware or as dedicated circuitry within the controller 1232, or any combination thereof.

The enumeration message identifier 1244 is configured to determine whether an enumeration message received via the host interface 1222 is a command or a response message. For example, the controller 1232 may be configured to receive an enumeration message via the host interface 1222 and to provide at least a header portion of the enumeration message to the enumeration message identifier 1244. The enumeration message identifier 1242 may locate a message type identifier within the header portion and compare the located message type identifier with a command type indicator, a response type indicator, or both. For example, the enumeration message include a specified message type indicator at a predetermined location in the message header. The enumeration message identifier 1244 may generate an output indicating whether the enumeration message is a command or a response message.

The distinct identifier selector 1246 is configured to select a distinctive device identifier value according to one or more selection rules. For example, the distinct identifier selector 1246 may operate according to a selection rule to generate a distinctive identifier value in response to the enumeration message identifier 1244 determining that a received enumeration is a command (and not a response) by performing a computation of used identifier values 1247 to generate a result that does not duplicate any of the used identifier values 1247, as described with respect to the system 200 of FIGS. 2-4. To illustrate, the distinct identifier selector 1246 may retrieve all used identifier values 1247 (e.g. from the RAM 1242, the flash storage 1252, or other tangible storage of the storage device 1220), and add all retrieved identifier values 1247 to generate a sum value, and then add a "1" value to the sum value to generate a distinctive result value.

As another illustration, the distinct identifier selector 1246 may select an initial trial value, such as by random or pseudo-random selection, by accessing a predetermined value, or by computing the initial trial value as a function of one or more parameters, compare the initial trial value to one or more of the used identifier values 1247, and select the trial value as the identifier value in response to determining that the trial value does not match any of the used identifier values 1247. If the trial value duplicates a used identifier value, the distinct identifier selector 1246 may select a next trial value, such as by random or pseudo-random selection, by accessing a predetermined next value, or by computing the next trial value as a function of one or more parameters (e.g. adding an offset to the initial trial value). The distinct identifier selector 1246 may continue iteratively selecting and comparing trial values until a value is determined to not match any of the used identifier values 1247.

As another example, the distinct identifier selector 1246 may operate according to a selection rule to generate a distinctive identifier value in response to the enumeration message identifier 1244 determining that a received enumeration is a command (and not a response) by using a most recently received used identifier value as a threshold value, as described with respect to the system 600 of FIGS. 6-8. To illustrate, the distinct identifier selector 1246 may retrieve a most recently used identifier value from the used identifier values 1247. The most recently used identifier value may be retrieved from a dedicated threshold value storage maintained by the controller 1232 from a memory location that may store multiple used identifier values in an order of receipt at the storage device 1220 or may indicate an association with one or more timestamps to indicate a relative time of receipt of the stored identifiers. The distinct identifier selector 1246 may add an offset value to the most recently used identifier value as described with respect to the first device 620 of FIG. 6, subtract an offset value from the most recently used identifier value as described with respect to the first device 620 of FIG. 6, or use the most recently received used device indicator value to define an allowable identifier range of values as described with respect to the first device 620 of FIG. 6. For example, in an embodiment where a maximum number of devices that can be coupled to a memory device interface of a host device is 16 such that an initial allowed range of identifiers is 0 to 15, in response to a most recently received used identifier value of "4" the distinct identifier selector 1246 may define a non-allowed identifier range of values to be 0 to 4 and an allowed identifier range of values to be 5 to 15.

As another example, the distinct identifier selector 1246 may operate according to a selection rule to generate a distinctive identifier value in response to the enumeration message identifier 1244 determining whether a received enumeration is a command or a response, as described with respect to the system 900 of FIGS. 9-11. Generation of the distinctive identifier value may be performed according to one or more of the described techniques.

The controller 1232 may be configured to operate according to a particular one or more of the selection rules. For example, the controller 1232 may be programmable to receive one or more additional selection rules or replacement selection rules. Selection of a particular selection rule may be controlled by logic at the controller 1232 or in response to external instructions, such as an instruction from a host device.

The enumeration response generator 1248 is configured to receive the selected distinctive device identifier value from the distinct identifier selector 1246 and to generate a response message that indicates the distinctive device identifier value. For example, the enumeration response generator 1248 may write a type indicator to a response header indicating a response type message and may write a destination indicator to the response header indicating a host device as the intended recipient. The enumeration response generator 1248 may write the distinctive device identifier value or data indicating the distinctive device identifier value to a body portion of the message, such as at one or more predefined field locations of the message. The enumeration response generator 1248 may perform a parity check or perform a CRC operation to generate error detection data and may add the error detection data to a predetermined field location of the message.

The controller 1232 may further be configured to send a response message generated by the enumeration response generator 1248 to a host device via one or more interfaces of the host interface 1222. Operation of the storage device 1220 is further described with respect to FIGS. 13-14.

Figure 13:
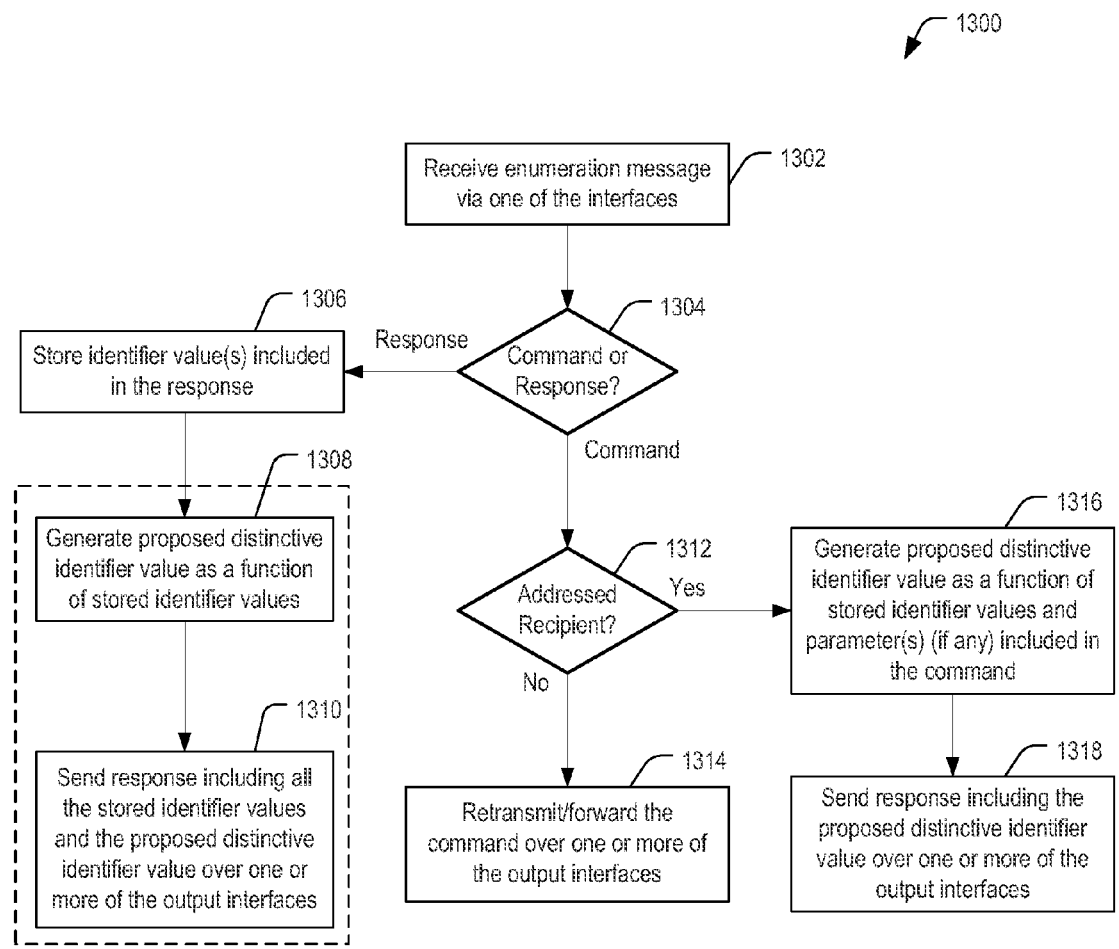
FIG. 13 is a flow diagram of a first particular embodiment of a method of selecting an identifier value.

FIG. 13 is a flow diagram of a first embodiment of a method of selecting an identifier value that may be performed by the storage device 1220 of FIG. 12. The method 1300 includes, at 1302, receiving an enumeration message via one of the interfaces. A determination is made whether the enumeration message is a command, such as an enumeration request command, or a response, such as an enumeration response, at 1304. For example, the determination may be made by the enumeration message identifier 1244 of FIG. 12. The enumeration message may be part of a more generic initialization command that also takes care of enumeration. In response to the enumeration message being identified as a response, at 1304, one or more identifier values included in the response are stored, at 1306.

Optionally, such as when implemented in a system, such as the system 900 of FIGS. 9-11, in response to the enumeration message being identified as the response, at 1304, processing continues with generating a proposed distinctive identifier value as a function of stored identifier values, at 1308 and sending a response including all of the stored identifier values and the proposed distinctive identifier value over one or more of the output interfaces, at 1310. For example, the distinctive identifier value may be generated by the distinct identifier selector 1246 of FIG. 12 and the response may be generated by the enumeration response generator 1248 of FIG. 12.

In response to the enumeration message being identified as a command, at 1304, a determination may be made as to whether the receiving device is an addressed recipient, at 1312. For example, when the receiving device has transitioned to an initialization complete state, or as another example when the receiving device has already selected a device identifier value, the receiving device may determine that the receiving device is not an addressed recipient of an enumeration message sent from a host. As another example, when the command indicates one or more message recipients but does not indicate the receiving device as a recipient, the receiving device may determine itself to not be an addressed recipient. As other examples, when the command includes the receiving device's distinctive identifier value or when the command is an enumeration command and the receiving device does not yet have a distinctive identifier value, the receiving device may operate as if the receiving device is an addressed recipient.

In response to determining that the receiving device is not an addressed recipient, at 1312, the command is retransmitted or forwarded over one or more of the output interfaces, at 1314. In response to determining that the receiving device is an addressed recipient, at 1312, a proposed distinctive identifier value is generated as a function of stored identifier values and parameters (if any) included in the command, at 1316. For example, any number of parameters may be included in the command, such as to indicate an identifier value threshold, to indicate other used identifier values, or to direct the receiving device to use a particular selection rule as described with respect to FIG. 12, as illustrative, non-limiting examples. A response is sent including the proposed distinctive identifier value over one or more of the output interfaces, at 1318. The distinctive identifier value may be generated by the distinct identifier selector 1246 of FIG. 12 and the response may be generated by the enumeration response generator 1248 of FIG. 12.

Figure 14:
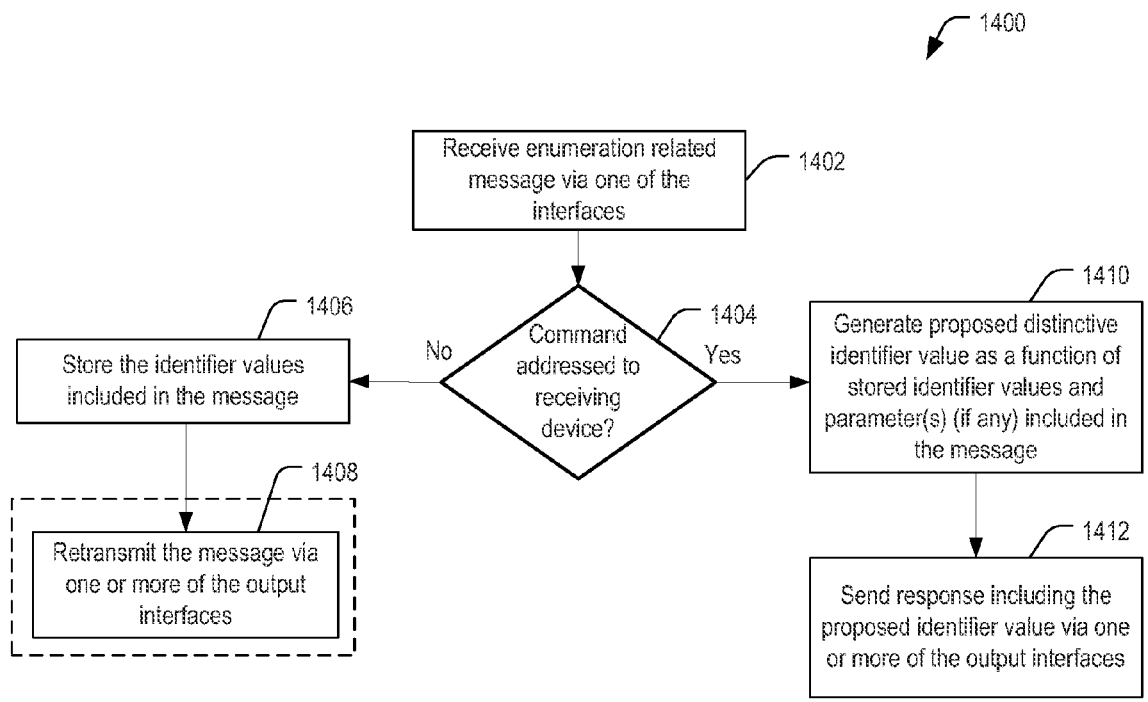
FIG. 14 is a flow diagram of a second particular embodiment of a method of selecting an identifier value.

FIG. 14 is a flow diagram of a second particular embodiment of a method of selecting an identifier value that may be performed by the storage device 1220 of FIG. 12. The method 1400 includes receiving an enumeration related message via one of the interfaces, at 1402. A determination may be made whether the enumeration related message is a command addressed to the receiving device, at 1404. In a particular example, a message is determined to be addressed to a receiving device when: (1) the device receives an enumeration message while the device does not yet have its own identifier value, or (2) the device has its identifier value set and the received message specifically contains the identifier value, or (3) the device has its identifier value set and the received message is a broadcast message and/or a multicast message. For example, the determination may be made by the enumeration message identifier 1244 of FIG. 12. When the enumeration related message is determined to not be a command addressed to the receiving device, at 1404, all used device identifier values in the message are stored, at 1406, and the message is optionally retransmitted via one or more output interfaces, at 1408.

When the enumeration related message is determined to be a command addressed to the receiving device, at 1404, a proposed distinctive identifier value is generated as a function of stored identifier values and parameters (if any) included in the message, at 1410. A response is sent including the proposed identifier value via one or more of the output interfaces, at 1412. For example, the distinctive identifier value may be generated by the distinct identifier selector 1246 of FIG. 12 and the response may be generated by the enumeration response generator 1248 of FIG. 12.

Figure 15:
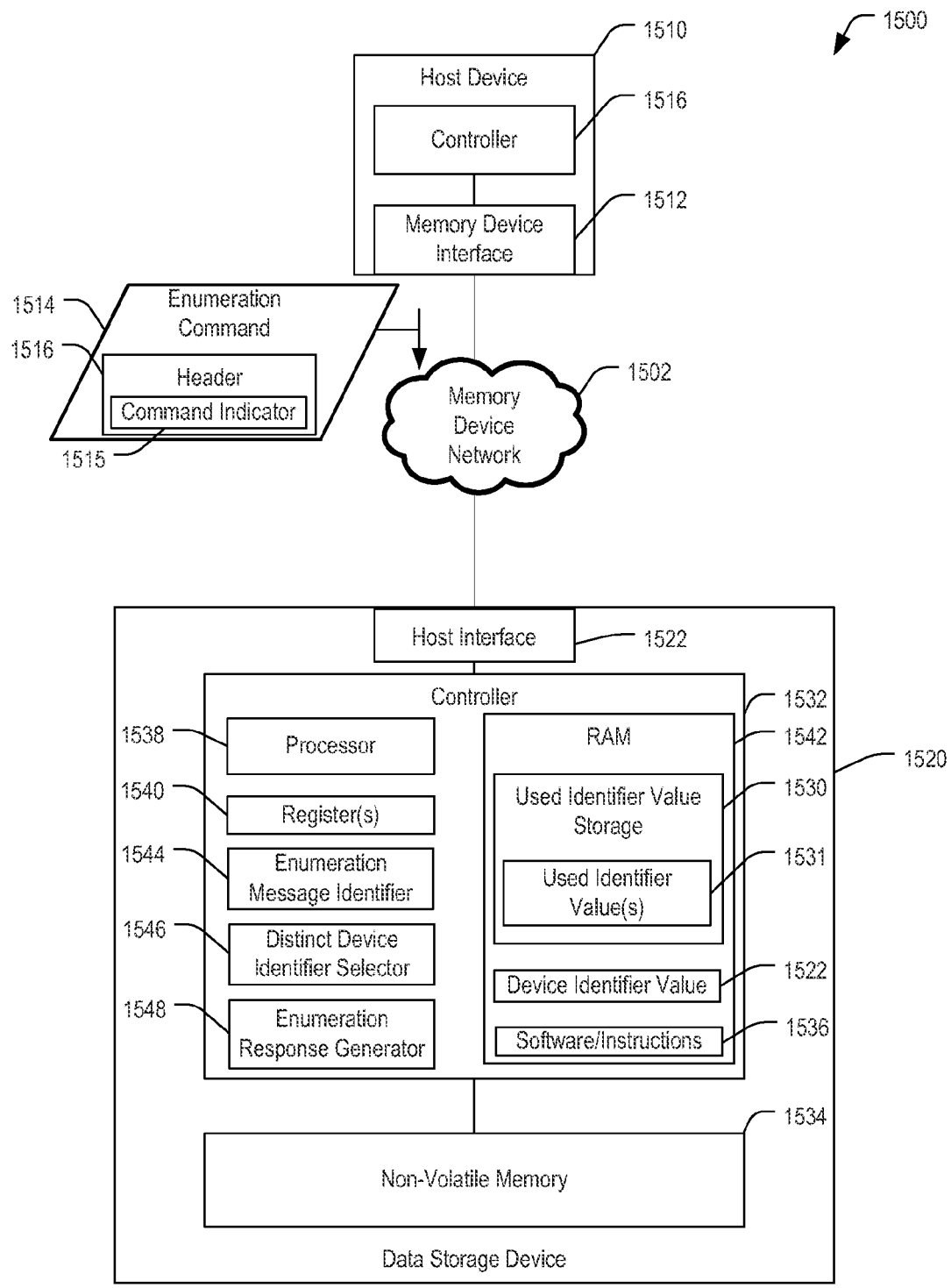
FIG. 15 is a block diagram of a seventh particular embodiment of a system to select a device identifier value.

FIG. 15 is a block diagram of a seventh particular embodiment of a system to select a device identifier value. The system 1500 includes a host device 1510 coupled to a data storage device 1520 via a memory device network 1502. The system 1500 may operate substantially as described with respect to the system 100 of FIG. 1, the system 200 of FIGS. 2-4, the system 500 of FIG. 5, the system 600 of FIGS. 6-8, the system 900 of FIGS. 9-11, or the system 1200 of FIG. 12.

The host device 1510 includes a controller 1516 coupled to a memory device interface 1512. The controller 1516 may be configured to perform an enumeration operation to obtain a set of distinct identifier values corresponding to multiple devices coupled to the memory device interface 1512. The representative data storage device 1520 represents one of the multiple devices. The enumeration operation may include sending a first enumeration message 1514, such as an enumeration command, via the memory device interface 1512. The first enumeration message 1514 includes a command indicator 1515 that may be embedded within a header 1516 portion of the enumeration message 1514. The enumeration operation may also include receiving distinctive device identifier values via one or more enumeration response messages. A first distinctive identifier value may correspond to a first device of the multiple devices and a second distinctive identifier value may correspond to a second device of the multiple devices. Data indicating one or more used identifier values (e.g. including the first distinctive identifier value) is provided to the second device prior to selection of the second distinctive identifier value. Each received distinctive identifier value enables the host device 1510 to specifically identify the corresponding device as a message recipient. For example, each received distinctive identifier value may enable the host device 1510 to access the corresponding device by using the distinctive identifier value to specify the corresponding device as a message recipient. The distinctive identifier values may be received via enumeration response messages as described with respect to the response 126 of FIG. 1, the responses 226, 346, and 466 of FIGS. 2-4, the response 546 of FIG. 5, the responses 626, 746, and 866 of FIGS. 6-8, or the response 1166 of FIG. 11, as illustrative, non-limiting examples.

The data storage device 1520 is adapted to be operatively coupled to a host device as well as one or more other devices and includes a host interface 1522 that is coupled to the memory device interface 1512 of the host device 1510 via the memory device network 1502. A controller 1532 is coupled to the host interface 1522 and coupled to a non-volatile memory 1534. The host interface 1522 may correspond to the host interface 222 of FIG. 2, the host interface 522 of FIG. 5, the host interface 622 of FIG. 6, the host interface 922 of FIG. 9, or the host interface 1222 of FIG. 12, as illustrative, non-limiting examples. The non-volatile memory 1534 may be a flash memory array, as an illustrative example.

The controller 1532 includes a processor 1538, one or more registers 1540, and a random access memory (RAM) 1542. The controller 1532 also includes an enumeration message identifier 1544, a distinct device identifier selector 1546, and an enumeration response generator 1548. The RAM 1542 includes a used identifier value storage 1530 configured to store one or more used identifier values 1531. The RAM 1542 may also include a device identifier value 1522 and software or other computer readable instructions 1536 that are executable by the hardware processor 1538 to execute one or more algorithms to enable the controller to select a distinctive device identifier value 1522 different from any identifier value that any of the other devices have indicated as being used (e.g. the distinctive device identifier value 1522 is a value other than any identifier value indicated as used by any other device coupled to the memory device interface 1512 of the host device 1510).

The controller 1532 is configured to receive an enumeration message via the host interface 1522 and to identify the received enumeration message as a command originated by the host device 1510 or as a response message from one of the other devices. The controller 1532 is configured to provide the received enumeration message to the enumeration message identifier 1544. The enumeration message identifier 1544 generates an output indicating whether the enumeration message is a command or a response message according to any one or more of the techniques described with respect to the enumeration message identifier 1244 of FIG. 12. The enumeration message identifier 1544 may be an application run by the processor 1538 by executing at least a portion of the executable instructions 1536, dedicated circuitry, firmware, or any combination thereof.

The controller 1532 is configured to, in response to identifying the received enumeration message as a command, selectively initiate sending an enumeration response message to the host device 1510, the enumeration response message indicating the distinctive device identifier value 1522. The controller 1532 is configured to provide the output of the enumeration message identifier 1544 to the distinct device indicator selector 1546. The distinct device indicator selector 1546 accesses the used identifier values 1531 and generates an output indicating the distinct device indicator value 1522 according to any one or more of the techniques described with respect to the distinct device indicator selector 1246 of FIG. 12. The distinct device indicator selector 1546 may be an application run by the processor 1538 by executing at least a portion of the executable instructions 1536, dedicated circuitry, firmware, or any combination thereof.

The controller 1532 is configured to provide the output of the distinct device indicator selector 1546 indicating the distinctive device indicator value 1522 to the enumeration response generator 1548. The enumeration response generator 1548 generates a response that includes the distinctive device identifier value according to any one or more of the techniques described with respect to the enumeration response generator 1248 of FIG. 12. The enumeration response generator 1548 may be an application run by the processor 1538 by executing at least a portion of the executable instructions 1536, dedicated circuitry, firmware, or any combination thereof.

The controller 1532 is configured to, in response to identifying the enumeration message as a response message from one of the other devices, read an identifier value used by such other device (e.g. an identifier value used by the device originating the received response) from the response message and store, at least temporarily, the identifier value to enable the device 1520 to select its distinctive device identifier value 1522. For example the controller 1532 is configured to store an identifier value read from a response message as a used identifier value 1531 at the used identifier value storage 1530 at the RAM 1542.

During operation, the controller 1532 operates to enable the data storage device 1520 to function in accordance with the operations described with respect to any one or more of the embodiments of FIGS. 1-14. For example, the controller 1532 may cause the data storage device 1520 to operate substantially as described with respect to the devices 220, 240, and 260 of FIG. 2. As another example, the controller 1532 may cause the data storage device 1520 to operate substantially as described with respect to the devices 520, 540 of FIG. 5. As another example, the controller 1532 may cause the data storage device 1520 to operate substantially as described with respect to the devices 620, 640, and 660 of FIG. 6. As another example, the controller 1532 may cause the data storage device 1520 to operate substantially as described with respect to the devices 920, 940, and 960 of FIG. 9. After an enumeration process is over, or the data storage device 1520 enters an initialization complete state, or the distinct device identifier value 1522 is transmitted to the host device 1510, or any combination thereof, the controller 1532 is responsive to memory access requests that include the distinctive device identifier value 1522 to provide access to the non-volatile memory 1534. After selecting the distinctive device identifier value, the data storage device 1520 may forward an enumeration command to a next device without generating a response message in response to the enumeration command not specifically identifying any recipients (e.g. where the enumeration command is a broadcast enumeration command).

Although the processor 1538 is illustrated as a single processor, in other embodiments the processor 1538 may include multiple general purpose or special purpose processors, such as one or more digital signal processors (DSPs). In addition, although the RAM 1542 and the one or more registers 1540 are illustrated as embedded with the controller 1532, in other embodiments the RAM 1542, the one or more registers 1540, or any combination thereof, may be separate from the controller 1532 but accessible to the controller 1532.

Figure 16:
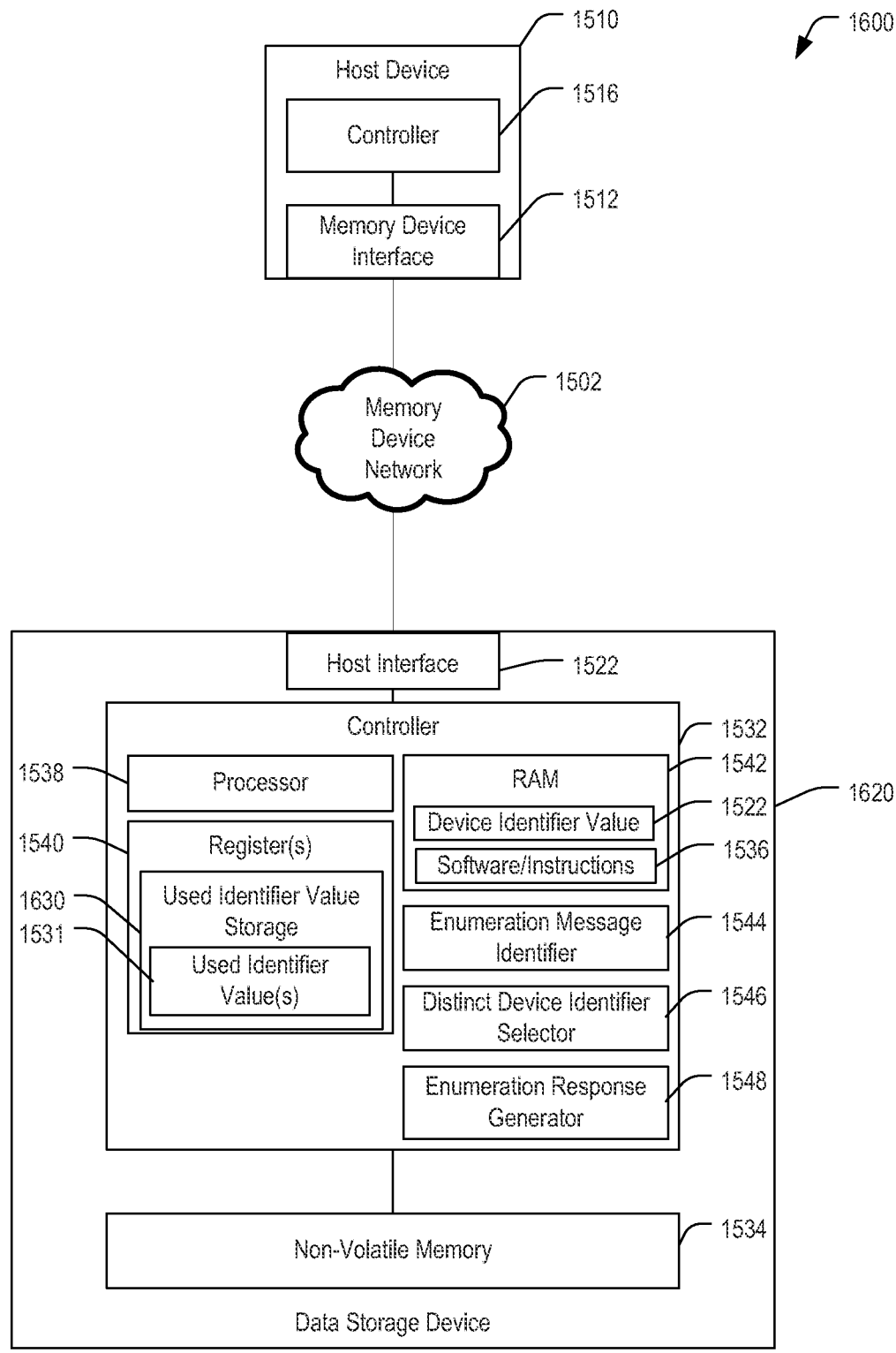
FIG. 16 is a block diagram of an eighth particular embodiment of a system to select a device identifier value.

FIG. 16 is a block diagram of an eighth particular embodiment of a system to select a device identifier value. The system 1600 includes the host device 1510 and the memory device network 1502 described with respect to FIG. 15.

A data storage device 1620 includes the host interface 1522, the controller 1532 coupled to the host interface 1522, and the non-volatile memory 1534, as described with respect to FIG. 15. The controller 1532 includes the processor 1538, the one or more registers 1540, and the RAM 1542. The controller 1532 also includes the enumeration message identifier 1544, the distinct device identifier selector 1546, and the enumeration response generator 1548. The RAM 1542 includes the device identifier value 1522 and the software or other computer readable instructions 1536.

As illustrated, a used identifier value storage 1630 is located at the one or more registers 1540 and configured to store the one or more used identifier values 1531. For example, the used identifier value storage 1630 may include one or more dedicated registers sized to store a number of identifiers up to a largest number of devices that can be coupled to the memory device interface 1512 of the host device 1510. As another example, the used identifier value storage 1630 may operate as a temporary storage, such as to temporarily store one or more of the identifier values read from a response to perform an arithmetic operation to compute the distinctive device identifier value 1546, and to write the stored identifier values 1531 and the distinctive device identifier value 1546 to a response message.

Figure 17:
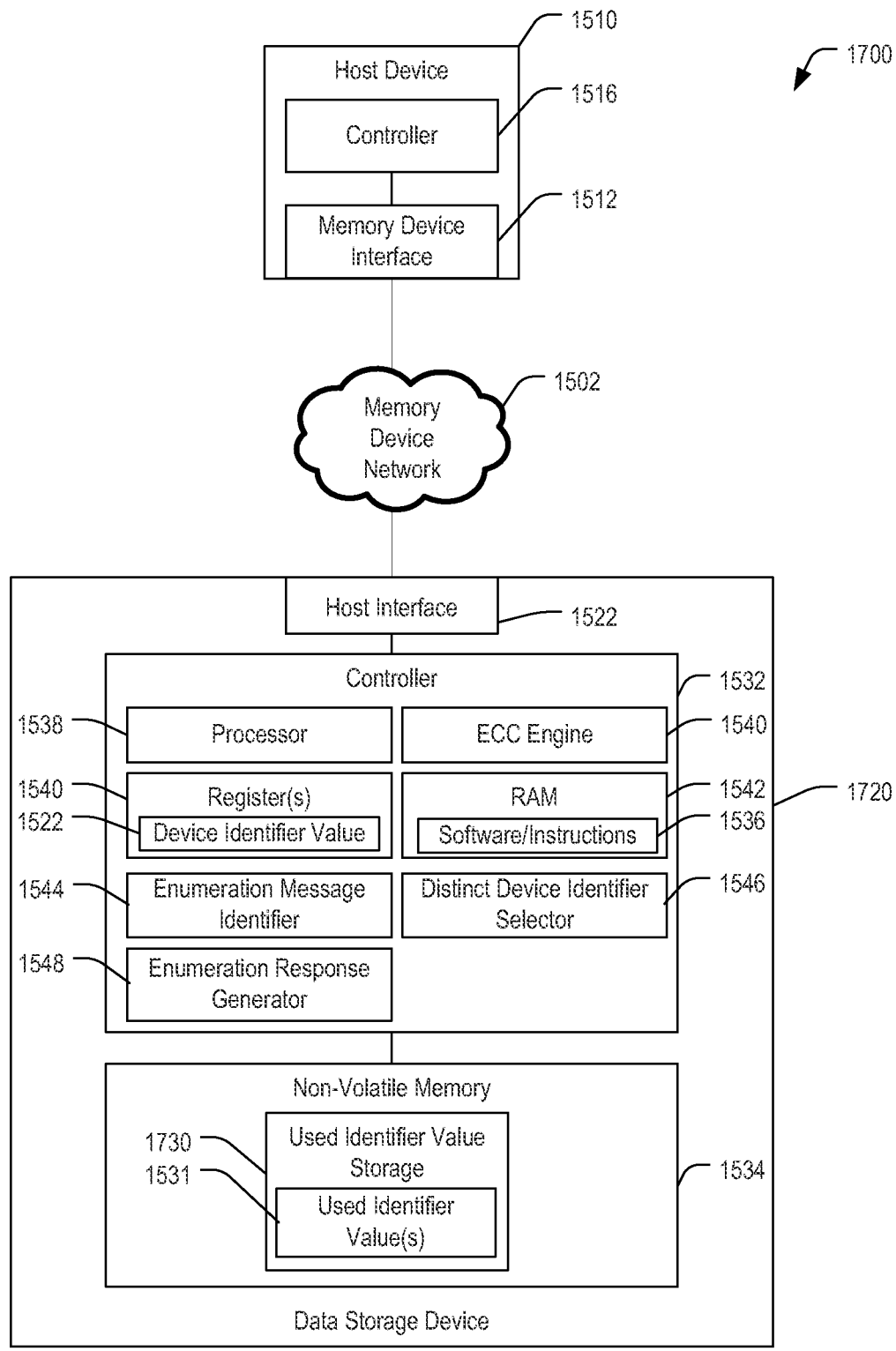
FIG. 17 is a block diagram of a ninth particular embodiment of a system to select a device identifier value.

FIG. 17 is a block diagram of a ninth particular embodiment of a system to select a device identifier value. The system 1700 includes the host device 1510 and the memory device network 1502 described with respect to FIG. 15.

A data storage device 1720 includes the host interface 1522, the controller 1532 coupled to the host interface 1522, and the non-volatile memory 1534, as described with respect to FIG. 15. The controller 1532 includes the processor 1538, the one or more registers 1540, and the RAM 1542. The controller 1532 also includes the enumeration message identifier 1544, the distinct device identifier selector 1546, and the enumeration response generator 1548. The RAM 1542 includes the device identifier value 1522 and the software or other computer readable instructions 1536. As illustrated, a used identifier value storage 1730 is located at non-volatile memory 1534 and configured to store the one or more used identifier values 1531.

Figure 18:
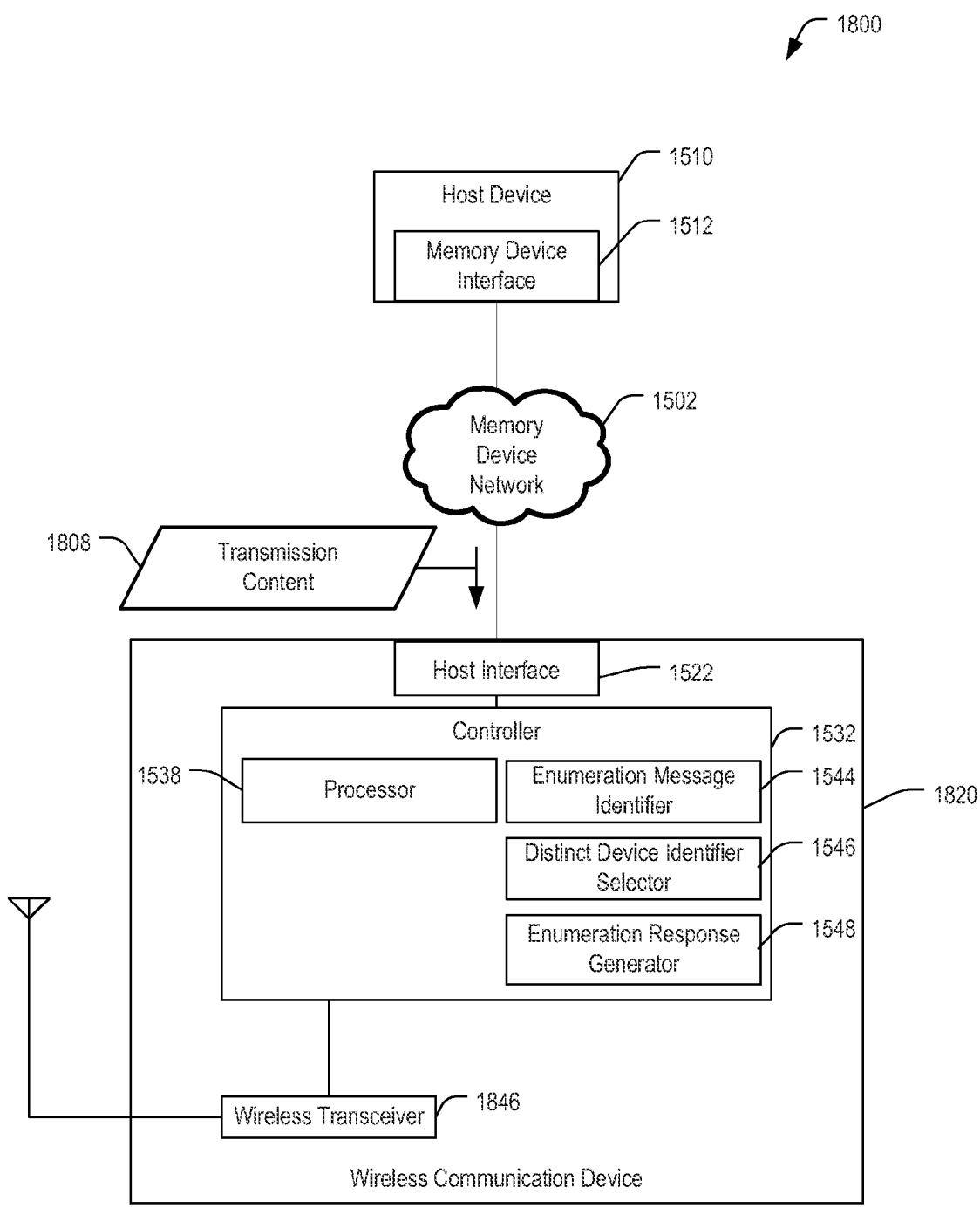
FIG. 18 is a block diagram of a tenth particular embodiment of a system to select a device identifier value.

FIG. 18 is a block diagram of a tenth particular embodiment of a system to select a device identifier value. The system 1800 includes the host device 1510 and the memory device network 1502 described with respect to FIG. 15.

A wireless communication device 1820 includes the host interface 1522 coupled to the controller 1532. The wireless communication device 1820 also includes a wireless transceiver 1846 coupled to the controller 1532.

The controller 1532 includes the processor 1538, the enumeration message identifier 1544, the distinct device identifier selector 1546, and the enumeration response generator 1548. The controller 1532 is configured to provide transmission content 1808 received from the host device 1510 via the host interface 1522 to the wireless transceiver 1846. For example, the wireless transceiver 1846 may enable the wireless communication device 1846 to wireless communicate via a wireless protocol such as frequency-hopping spread spectrum radio ad-hoc network communication protocol (e.g. Bluetooth) or an Institute of Electrical and Electronics Engineers (IEEE) 802.11 protocol (e.g. Wi-Fi).

Figure 19:
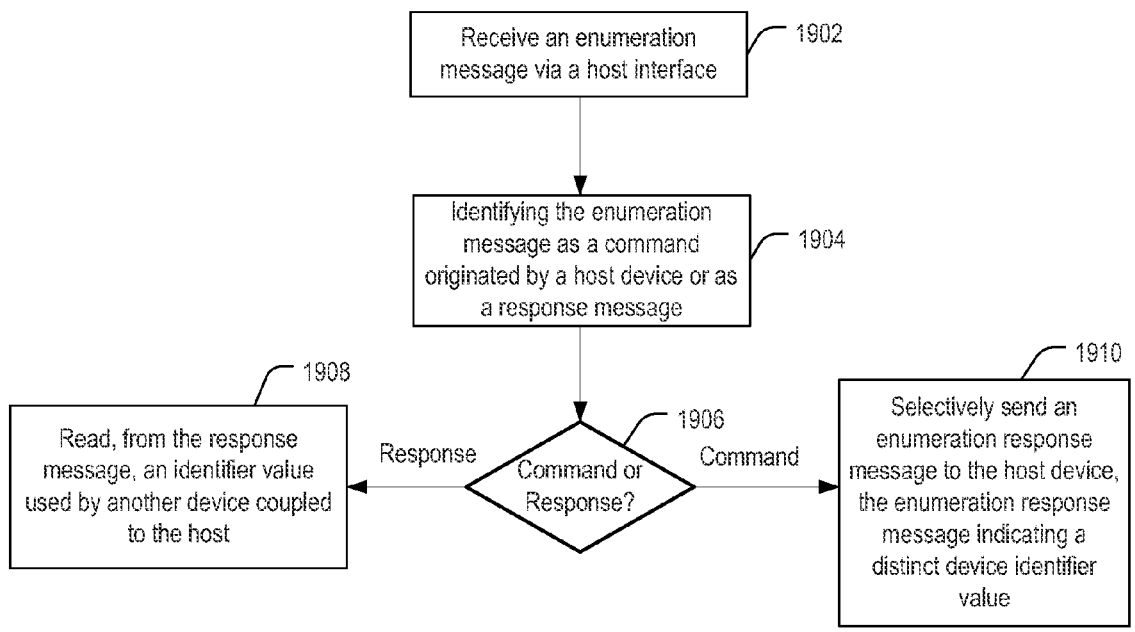
FIG. 19 is a flow diagram of a third particular embodiment of a method of selecting an identifier value.

Referring to FIG. 19, a method of selecting an identifier value at a device is illustrated. The device includes a host interface and the device is operatively coupled via the host interface to a host device as well as one or more other devices. An example of a host device is a memory card or a wireless communication device adapted to communicate with the host device via a memory device interface of the host device. The device is operative to select a distinctive device identifier value that is different from any identifier value that any of the other devices have indicated as being used. For example, if the device is the device 260 of FIG. 2, then the device selects a distinctive device identifier value other than a device identifier value selected as used by any of the devices 220 and 240 of FIG. 2.

In a particular embodiment, the method includes receiving an enumeration message at the device via the host interface, at 1902, and identifying the enumeration message as a command originated by the host device or as a response message from one of the other devices, at 1904. At decision step 1906, the method evaluates whether the enumeration message is a command or a response. In response to identifying the enumeration message as a command, the method selectively sends an enumeration response message that indicates the distinctive device identifier value to the host device, at 1910. The enumeration response message may be sent to the host device directly or may be sent to the host device via one or more other devices. The enumeration response message may also include cyclic redundancy check (CRC) data to allow the host to conduct error detection.

In response to identifying the enumeration message as a response message from one of the other devices, at 1906, the method reads from the response message an identifier value used by such other device, at 1908, and at least temporarily stores this identifier value (i.e. the identifier value read from the response message) at the device to enable the device to select its distinctive device identifier value (i.e. to select the distinctive device identifier value for the device). For example, the device 240 of FIG. 2 may read an identifier value used by the device 220 from the response message 226 of FIG. 2. The identifier value read from the response message is at least temporarily stored at the device to enable selection of a device identifier value that is distinct from the device identifier read from the response message. The selected device identifier value enables a host device to access the device by use of the distinctive device identifier value, such as by specifying the device as a message recipient.

Figure 20:
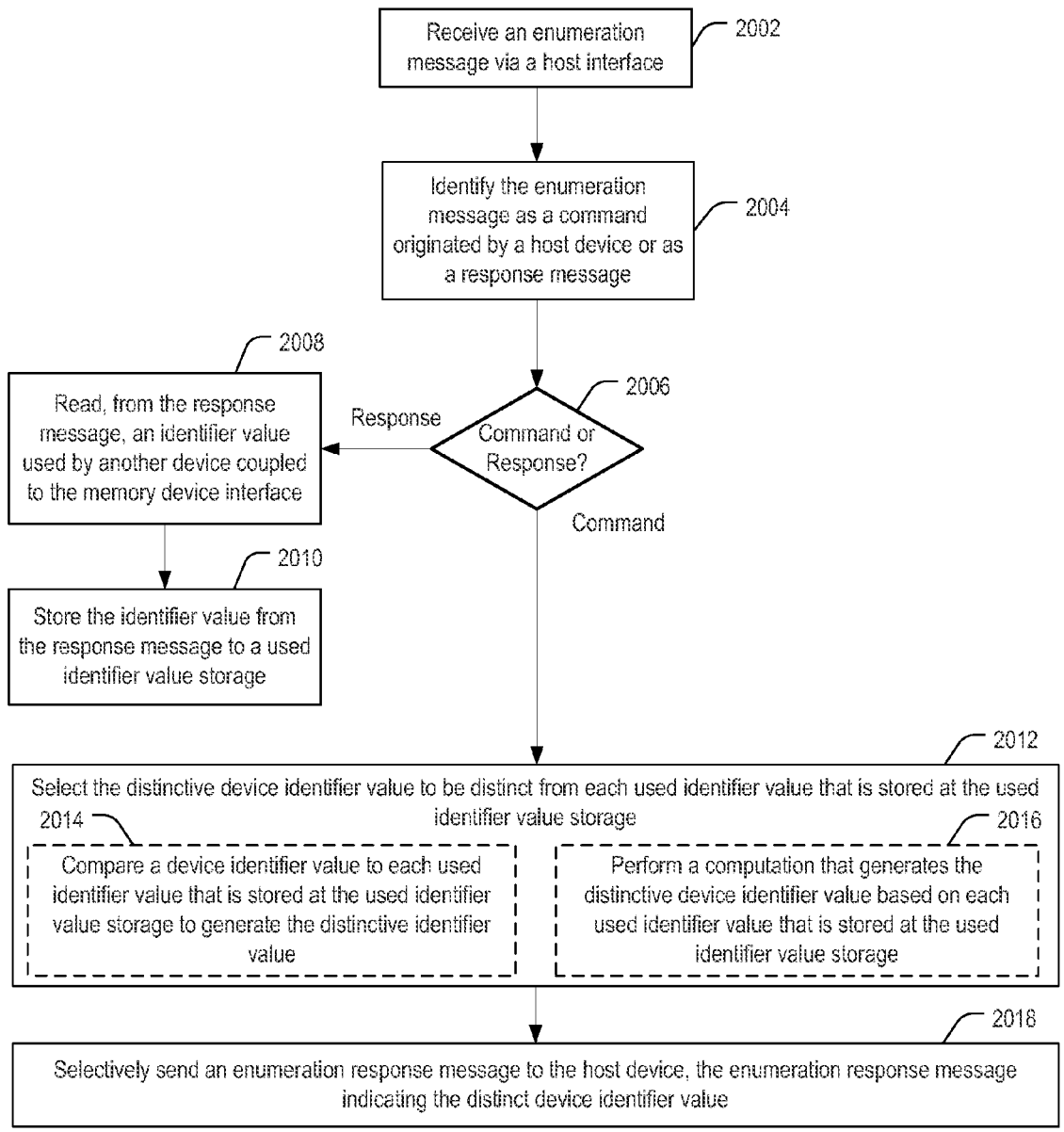
FIG. 20 is a flow diagram of a fourth particular embodiment of a method of selecting an identifier value.

Referring to FIG. 20, another embodiment of a method of selecting an identifier value at a device is shown. The method includes receiving an enumeration message via a host interface, at 2002, and identifying the enumeration message as a command originated by a host device or as a response message, at 2004. The command or response determination is made at 2006. Upon determining that the enumeration message is a response, the method reads an identifier value used by another device coupled to a memory device interface of a host device from the response message, at 2008. The method also stores the identifier value read from the response message to a used identifier value storage area, at 2010. For example, the used identifier value storage area may be the storage area illustrated as storing the table 250 of FIG. 2.

Upon determining that the enumeration message is a command, the method selects a distinctive device identifier value to be distinct from each used identifier value that is stored at the used identifier value storage, at 2012. As part of making the selection of the distinctive device identifier value, the method may include comparing a device identifier value to each used identifier value that is stored at the used identifier value storage to generate the distinctive identifier value, at 2014, and alternatively, or in addition, performs a computation that generates the distinctive device identifier value based on each used identifier value that is stored at the used identifier value storage, at 2016. The device may be configured to accumulate multiple used identifier values at the used identifier storage. The method may compare a device identifier value to each used identifier value that is stored at the used identifier value storage to generate the distinctive identifier value. Thus, the distinctive device identifier value may be selected to be distinct from each used identifier value that is stored at the used identifier value storage.

The method then selectively sends an enumeration response message that indicates the distinctive device identifier value to the host device, at 2018. For example, the method may include determining whether the device is an addressed recipient of the command, such as described with respect to decision 1312 of FIG. 13. For example, the command is forwarded without sending the enumeration response message in response to the command indicating one or more recipients but not indicating the device as a recipient.

Figure 21:
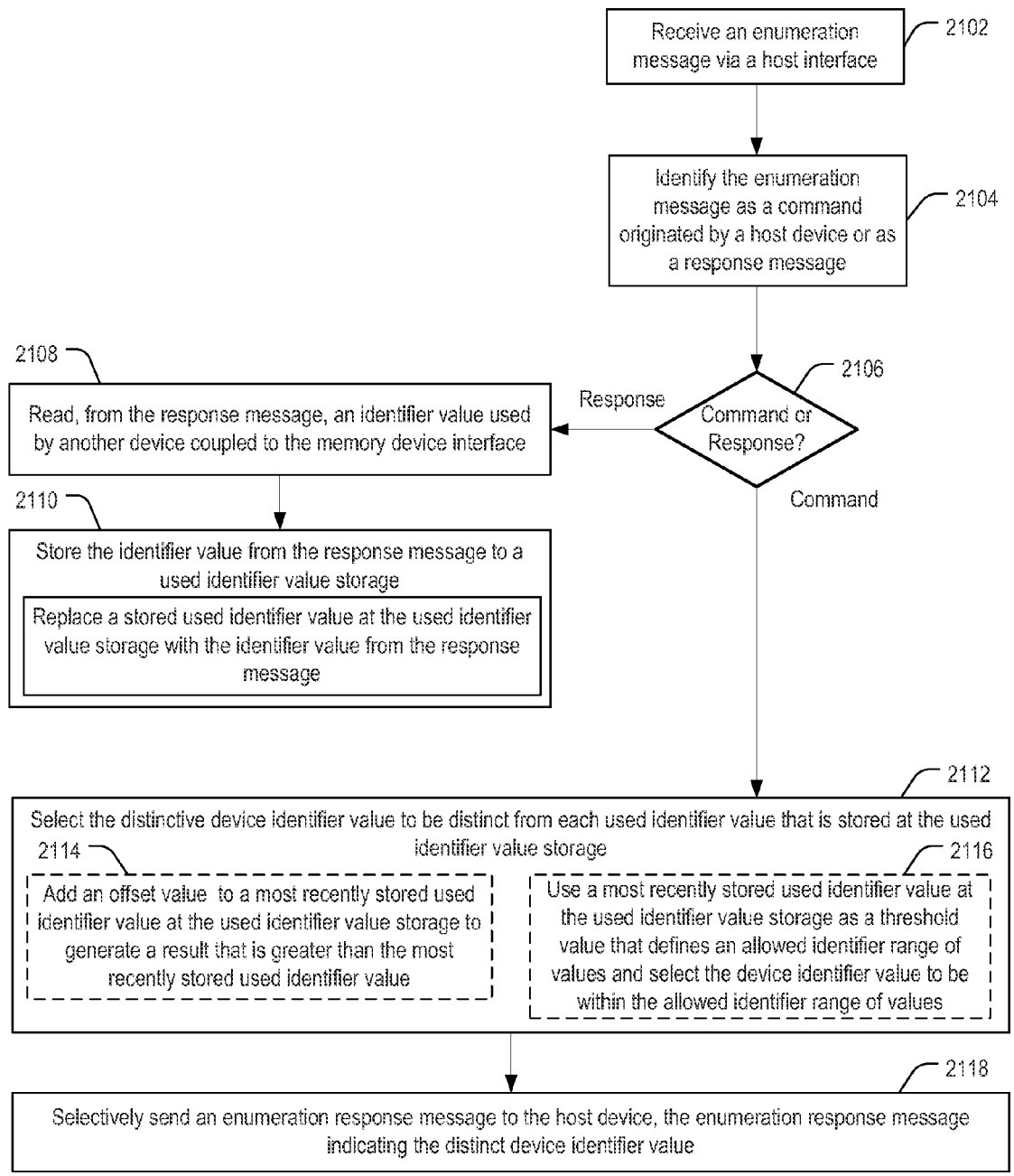
FIG. 21 is a flow diagram of a fifth particular embodiment of a method of selecting an identifier value.

Referring to FIG. 21, another embodiment of a method of selecting an identifier value at a device is shown. The method includes receiving an enumeration message via a host interface, at 2102, and identifying the enumeration message as a command originated by a host device or as a response message, at 2104. The command or response determination is made at 2106. Upon determining that the enumeration message is a response, the method reads an identifier value used by another device coupled to the memory device interface from the response message, at 2108. The method also stores the identifier value read from the response message to a used identifier value storage area, at 2110. The method may also includes replacing a stored used identifier value at the used identifier value storage with the identifier value read from the response message.

Upon determining that the enumeration message is a command, the method selects a distinctive device identifier value to be distinct from each used identifier value that is stored at the used identifier value storage, at 2112. As part of making the selection of the distinctive device identifier value, the method may add an offset value to a most recently stored used identifier value at the used identifier value storage to generate a result that is greater than the most recently stored used identifier value, as shown at 2114. Alternatively, or in addition, the device may use a most recently stored used identifier value at the used identifier value storage as a threshold value that defines an allowed identifier range of values, and the method may select the distinctive device identifier value by selecting the device identifier value to be within the allowed identifier range of values, at 2116. For example, if the most recently stored used identifier value has a value of two, the method would define an allowed identifier range of values as values greater than two. The method could then select a distinctive identifier value by selecting a value greater than two (e.g. three). The method then selectively sends an enumeration response message that indicates the distinctive device identifier value to the host device, at 2118. For example, the method may select whether to send an enumeration response in based on a determination whether the device is an addressed recipient of the command, such as described with respect to decision 1312 of FIG. 13.

Figure 22:
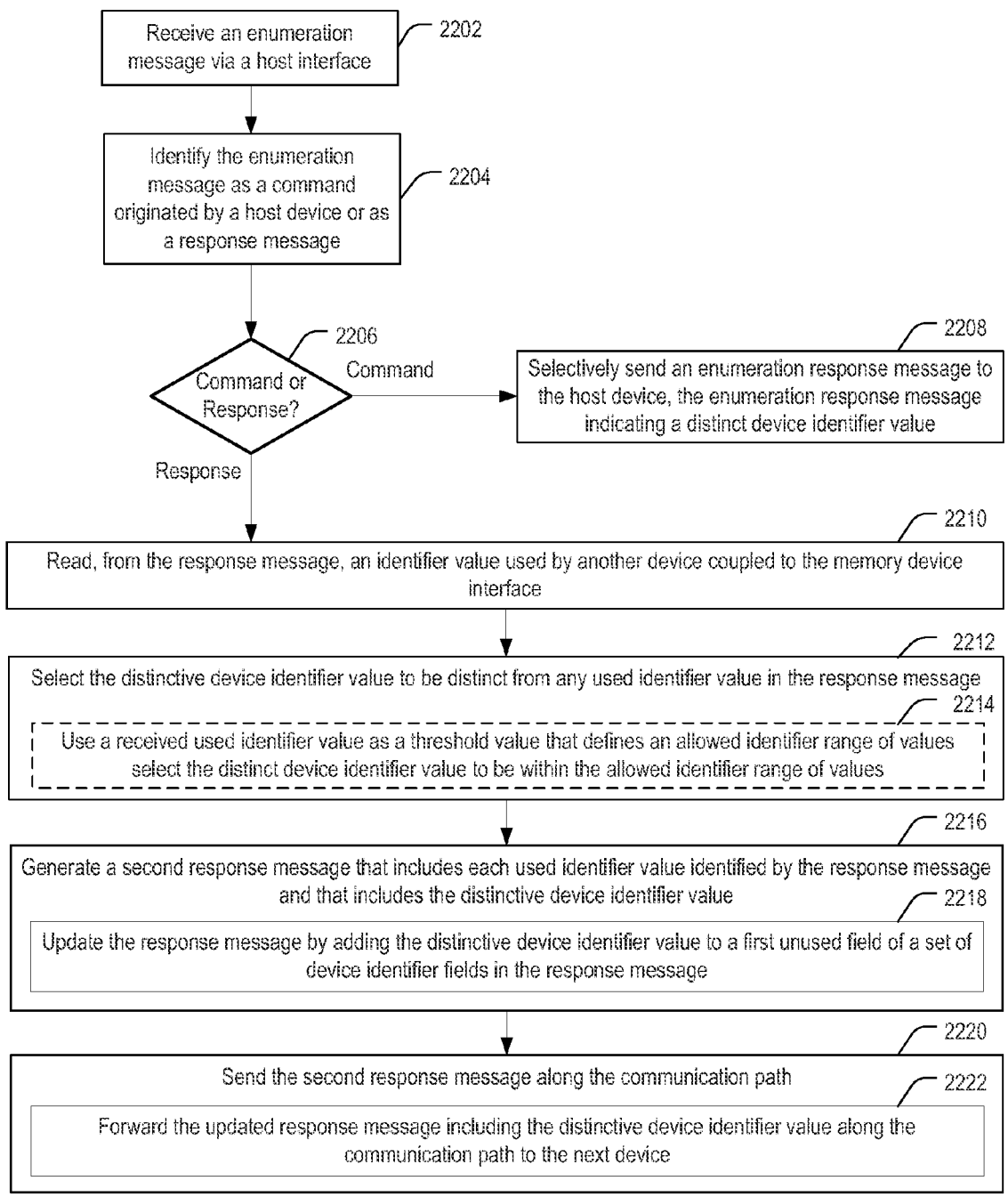
FIG. 22 is a flow diagram of a sixth particular embodiment of a method of selecting an identifier value.

Referring to FIG. 22, another embodiment of a method of selecting an identifier value at a device is shown. The method includes receiving an enumeration message via a host interface, at 2202, and identifying the enumeration message as a command originated by a host device or as a response message, at 2204. The command or response determination is made at 2206. Upon determining that the enumeration message is a command, the method selectively sends an enumeration response message that indicates a distinctive device identifier to the host device, the enumeration response message including a distinctive device identifier value, at 2208.

Upon determining that the enumeration message is a response, the method reads an identifier value used by another device coupled to the memory device interface from the response message, at 2210. In a particular illustrative example, the device has a second device position on a communication path and the response message originates from a first device having a first device position along the communication path. The response message may include a used identifier value of any device that has a corresponding position on the communication path between the first device position and the second device position.

The method may include selecting the distinctive device identifier value to be distinct from any used identifier value in the response message, at 2212. For example, the method may include using a received used identifier value as a threshold value to define an allowed identifier range of values, at 2214. The method may also include selecting the distinctive device identifier value by selecting the device identifier value to be within the allowed identifier range of values, at 2214.

The method further includes generating a second response message that includes each used identifier value identified by the response message and that includes the distinctive device identifier value, at 2216, and sending the second response message along the communication path, at 2220. As an illustrative example, the method may generate the second response message by updating the response message by adding the distinctive device identifier value to a first unused field of a set of device identifier fields in the response message, at 2218. The method may send the second response message by forwarding the updated response message including the distinctive device identifier value along the communication path to the next device, as shown at 2222.

In another illustrative example, a third device (e.g. device 260 of FIG. 2) has a last device position on the communication path and the distinctive device identifier value and each used identifier value included in the second response message is accessible to the third device and to any other device having a position on the communication path between the second device position and the last device position. As a result, as each device receives the propagated response, each device may read all used identifier values corresponding to devices having made identifier selection, select a distinctive identifier value, and forward the updated response to the next device along the communication path. Therefore, a single response including a set of distinctive identifier values may be received by the host device, such as the response 1166 of FIG. 11.

Figure 23:
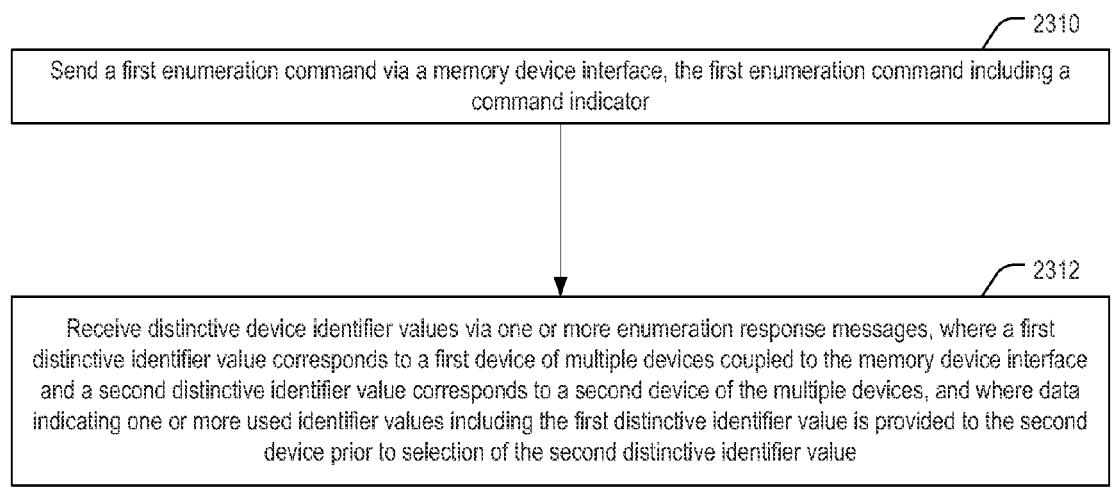
FIG. 23 is a flow diagram of a seventh particular embodiment of a method of selecting an identifier value.

Referring to FIG. 23, a method of enumerating devices coupled to a memory device interface of a host device is shown. The memory device interface is operatively coupled to multiple devices including a first device and a second device. For example, the memory device interface 212 of the host device 210 may be coupled to the first device 220, to the second device 240, and to other devices such as the third device 260, as shown in FIG. 2. The method includes sending a first enumeration command via the memory device interface, the first enumeration command including a command indicator, at 2310, and receiving distinctive device identifier values via one or more enumeration response messages, at 2312. In a particular example, a first distinctive identifier value corresponds to the first device and a second distinctive identifier value corresponds to the second device. To facilitate selection of distinctive device identifiers at a device (e.g. the second device 240) coupled to the host device, data indicating one or more used identifier values including the first distinctive identifier value is provided to the second device prior to selection of the second distinctive identifier value. The second distinctive identifier value enables the host device to specifically identify the second device as a message recipient. To illustrate, the host device may access the second device by using the second distinctive identifier value to specify the second device as a message recipient. For example, the host device 210, upon receiving the second device identifier of the second device 240, may communicate messages to the second device 240 by use of the second device identifier.

As a result, the enumeration operation is performed with each device selecting its identifier value to be other than previously selected identifier values (if any). The enumeration operation efficiently uses transmission cycles by eliminating the possibility that any device chooses an identifier value that is already used, thus eliminating messaging from the host device instructing devices to re-select identifier values and messaging from the devices to the host device with a next selected identifier value. As a result, the enumeration cycle can be completed efficiently for a large number of devices.

Although various components depicted herein are illustrated as block components and described in general terms, such components may include one or more microprocessors, state machines, or other circuits configured to enable the memory device 120 of FIG. 1, the device 220, 240, or 260 of FIGS. 2-4, the device 520 or 540 of FIG. 5, the device 620, 640, or 660 of FIGS. 6-8, the device 920, 940, or 960 of FIGS. 9-11, the storage device 1220 of FIG. 12, the data storage device 1520 of FIG. 15, the data storage device 1620 of FIG. 16, the data storage device 1720 of FIG. 17, or the wireless communication device 1820 of FIG. 18, to perform the particular functions attributed to such components, or any combination thereof.

In a particular embodiment, the data storage device 1520 may be a portable device configured to be selectively coupled to one or more external devices. However, in other embodiments, the memory device may be attached or embedded within one or more host devices, such as within a housing of a portable communication device. For example, the data storage device 1520 may be within a packaged apparatus such as a wireless telephone, personal digital assistant (PDA), gaming device or console, portable navigation device, or other device that uses internal non-volatile memory. In a particular embodiment, the non-volatile memory 1534 of the data storage device 1520 is a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of enumerating devices, the method comprising:

at a device with a host interface, wherein the device is operatively coupled via the host interface to a host device as well as to one or more other devices, and wherein the device is operative to select a distinctive device identifier value that is different from any identifier value that is identified as having been selected by any of the one or more other devices, performing:

receiving a first enumeration message from the host device prior to receiving, from any of the one or more other devices, an identifier value that is identified as having been selected by any of the one or more other devices, wherein the first enumeration message includes a parameter;

selecting the distinctive device identifier value according to a first selection rule or according to a second selection rule based on the parameter;

generating a second enumeration message, the second enumeration message including a set of device identifier fields, wherein a first identifier field of the set of device identifier fields includes the distinctive device identifier value; and sending the second enumeration message to the host device.

2. The method of claim 1, wherein the device is operatively coupled to the host device via a communication path that includes the one or more other devices, wherein the first enumeration message is sent as a first broadcast command via the communication path, and wherein sending the second enumeration message to the host device is performed by sending the second enumeration message as a second broadcast command via the communication path.

3. The method of claim 1, wherein the distinctive device identifier value being in the first device identifier field identifies the device as being in a first position, relative to the one or more other devices, to receive messages from the host device along a communication path.

4. The method of claim 1, wherein selecting the distinctive device identifier value includes selecting a random or pseudo-random value.

5. The method of claim 4, wherein the first enumeration message includes an identifier value threshold, and wherein selecting the distinctive device identifier value includes adding an offset to the identifier value threshold.

6. The method of claim 5, wherein the offset has a value of one.

7. The method of claim 1, wherein the device is embedded in the host device.

8. The method of claim 1, wherein the device is a memory card.

9. The method of claim 1, wherein the device is a wireless communication device adapted to communicate with the host device via the memory device interface.

10. The method of claim 1, wherein the device receives the first enumeration message from the host device via one or more pairs of differential signaling lines.

11. The method of claim 1, wherein the second enumeration message includes error detection data.

12. A data storage device comprising:
a host interface configured to operatively couple the data storage device to a host device and to one or more other devices; and
a controller coupled to the host interface, wherein the controller is configured to:
receive a first enumeration message from the host device prior to receiving an identifier value from any of the one or more other devices, wherein the first enumeration message includes a parameter;
determine a device identifier value according to a first selection rule or according to a second selection rule based on the parameter;
generate a second enumeration message, the second enumeration message including a set of device identifier fields, wherein a first identifier field of the set of device identifier fields includes the device identifier value; and
send the second enumeration message to the host device.

13. The data storage device of claim 12, wherein the host interface is configured to operatively couple the data storage device to the host device via a communication path that includes the one or more other devices, wherein the first enumeration message is sent as a first broadcast command via the communication path, and wherein the controller is configured to send the second enumeration message to the host device by sending the second enumeration message as a second broadcast command via the communication path.

14. The data storage device of claim 12, wherein the device identifier value being in the first device identifier field identifies the device as being in a first position, relative to the one or more other devices, to receive messages from the host device along a communication path.

15. The data storage device of claim 12, wherein determining the device identifier value includes selecting a random value or a pseudo-random value.

16. The data storage device of claim 12, wherein the data storage device is embedded in the host device.

17. The data storage device of claim 12, wherein the data storage device is a memory card.

18. The data storage device of claim 12, wherein the data storage device is a wireless communication device adapted to communicate with the host device via the memory device interface.

19. The data storage device of claim 12, wherein the host interface is configured to operatively couple the data storage device to the host device via one or more pairs of differential signaling lines.

20. The data storage device of claim 12, wherein the second enumeration message includes error detection data.

* * * * *